US010422879B2

(12) United States Patent
Nagai

(10) Patent No.: US 10,422,879 B2
(45) Date of Patent: Sep. 24, 2019

(54) TIME-OF-FLIGHT DISTANCE MEASURING DEVICE

(71) Applicant: DENSO CORPORATION, Kariya, Aichi-pref. (JP)

(72) Inventor: Toshiaki Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 15/525,311

(22) PCT Filed: Nov. 12, 2015

(86) PCT No.: PCT/JP2015/005649
§ 371 (c)(1),
(2) Date: May 9, 2017

(87) PCT Pub. No.: WO2016/075945
PCT Pub. Date: May 19, 2016

(65) Prior Publication Data
US 2017/0315238 A1 Nov. 2, 2017

(30) Foreign Application Priority Data

Nov. 14, 2014 (JP) .................................. 2014-231630
Nov. 21, 2014 (JP) .................................. 2014-236484

(51) Int. Cl.
*G01C 3/08* (2006.01)
*G01S 17/08* (2006.01)
(Continued)

(52) U.S. Cl.
CPC ............ *G01S 17/08* (2013.01); *G01S 7/4914* (2013.01); *G01S 7/4915* (2013.01); *G01S 17/36* (2013.01);
(Continued)

(58) Field of Classification Search
CPC ...... G01S 17/08; G01S 7/4915; G01S 7/4914; G01S 17/89; G01S 17/36; H04N 5/37452; H04N 5/35572; H04N 5/353
See application file for complete search history.

(56) References Cited

U.S. PATENT DOCUMENTS 7,379,100 B2 5/2008 Gokturk et al.
2007/0097349 A1 5/2007 Wada et al.
(Continued)

FOREIGN PATENT DOCUMENTS

JP 2007-281556 A 10/2007
JP 2010-025906 A 2/2010
(Continued)

OTHER PUBLICATIONS

Mitsunaga,Tomoo. "Spatially Varying Exposure : a Wide Dynamic Range Imaging Method." IPSJ SIG Technical Report, 147(20), 2005, 155-162. (with English translation attached).
(Continued)

*Primary Examiner* — Samantha K Abraham
(74) *Attorney, Agent, or Firm* — Posz Law Group, PLC

(57) ABSTRACT

A time-of-flight distance measuring device divides a base exposure period into a plurality of sub exposure periods and holds without resetting an electric charge stored in the sub exposure period for a one round period which is one round of the plurality of sub exposure periods. The distance measurement value of short time exposure is acquired during the one round period and the distance measurement value of long time exposure is acquired during a plurality of the one round periods. Both of the distance measurement value of the long time exposure and the distance measurement value of the short time exposure can be acquired from the same pixel. With this, a dynamic range is expanded without being restricted by a receiving state of reflected
(Continued)

light, optical design of received light, and an arrangement of pixels.

27 Claims, 46 Drawing Sheets

(51) Int. Cl.
| | | |
|---|---|---|
| G01S 17/36 | (2006.01) | |
| G01S 17/89 | (2006.01) | |
| H04N 5/353 | (2011.01) | |
| H04N 5/355 | (2011.01) | |
| H04N 5/3745 | (2011.01) | |
| G01S 7/491 | (2006.01) | |

(52) U.S. Cl.
CPC .............. *G01S 17/89* (2013.01); *H04N 5/353* (2013.01); *H04N 5/35572* (2013.01); *H04N 5/37452* (2013.01)

(56) References Cited

U.S. PATENT DOCUMENTS

| | | |
|---|---|---|
| 2011/0157354 A1 | 6/2011 | Kawahito |
| 2011/0164132 A1 | 7/2011 | Buettgen et al. |
| 2011/0194099 A1 | 8/2011 | Kamiyama |
| 2012/0177252 A1* | 7/2012 | Korekado ............. G01S 7/4915 382/106 |
| 2012/0306687 A1 | 12/2012 | Matsuo |
| 2013/0228691 A1 | 9/2013 | Shah |

FOREIGN PATENT DOCUMENTS

| | | |
|---|---|---|
| JP | 2013-050310 A | 3/2013 |
| JP | 2013-137242 A | 7/2013 |

OTHER PUBLICATIONS

Nayar, Shree K., and Tomoo Mitsunaga."High Dynamic Range Imaging: Spatially Varying Pixel Exposures." IEEE Conference on Computer Vision and Pattern Recognition (CVPR), vol. 1, Jun. 2000, 472-479.

Narasimhan, Srinivasa G., and Shree K.Nayar. "Enhancing Resolution Along Multiple Imaging Dimensions Using Assorted Pixels." IEEE Transations on Pattern Analysis and Machine Intelligence, vol. 27, No. 4, Apr. 2005, pp. 518-530.

* cited by examiner

TIME-OF-FLIGHT DISTANCE MEASURING DEVICE

CROSS-REFERENCE TO RELATED APPLICATIONS

The present application is a U.S. national stage of International Patent Application No. PCT/JP2015/005649 filed on Nov. 12, 2015 and is based on Japanese Patent Application No. 2014-231630 filed on Nov. 14, 2014, and Japanese Patent Application No. 2014-236484 filed on Nov. 21, 2014, the content of which is incorporated herein by reference.

TECHNICAL FIELD

The present disclosure relates to a time-of-flight distance measuring device that emits modulated light modulated by a pattern having a repeating period to a space and calculates a distance between an own device and a target by using an electric charge according to incident light including reflected light of the modulated light reflected by the target.

BACKGROUND

As a distance measuring device that calculates a distance between an own device and a target in a noncontact manner, a time-of-flight (TOF) distance measuring device is provided. The time-of-flight distance measuring device emits modulated light (distance measuring light) modulated by a pattern having a repeating period to a space and receives incident light including reflected light of the modulated light reflected by the target. The time-of-flight distance measuring device stores an electric charge according to the received incident light in a plurality of storage capacitors while distributing the electric charge by using a plurality of modulation switches, and the time-of-flight distance measuring device calculates the distance between the own device and the target by using a sampled value (for example, see Patent Literatures 1 to 4).

In the time-of-flight distance measuring device, when the distance between the own device and the target is short or when the target is formed by an object having a high reflectance, the reflected light with high intensity is received. On the other hand, when the distance between the own device and the target is long or when the target is formed by an object having a low reflectance, the reflected light with low intensity is only received. Thus, in the time-of-flight distance measuring device, a large dynamic range (for example, 80 dB or more) is required. In particular, in a case in which the device is mounted on a vehicle, when the distance between the own device and the target is short in a state in which at least one of the own device and the target (a person, a vehicle, a wall or the like) is moving, it is required to calculate the distance frequently (to increase a frame rate) in order to avoid collision with the target. That is, it is necessary to achieve both of the large dynamic range and the high frame rate.

It is difficult to achieve the dynamic range of 80 dB or more in a normal pixel, and therefore multiple exposure (a plurality of times of exposure) is necessary to be performed. However, when the multiple exposure is performed in series, exposure time becomes longer and therefore tracking performance against the moving target is deteriorated. Relating to the viewpoint, a method for grouping a plurality of pixels within a plane and changing the exposure time by group is disclosed (for example, see Non Patent Literatures 1 and 2).

PRIOR ART LITERATURES

Patent Literatures

Patent Literature 1: JP-5579893-B
Patent Literature 2: JP-2010-96730-A
Patent Literature 3: JP-5585903-B
Patent Literature 4: JP-2010-25906-A Non Patent Literatures Non Patent Literature 1: S. Nayar and T. Mitsunaga. "High Dynamic Range Imaging: Spatially Varying Pixel Exposure. "In IEEE Conference on Computer Vision and Pattern Recognition (CVPR), volume 1, pages 472-479, June 2000

Non Patent Literature 2: S. G. Narasimhan and S. K. Nayar "Enhancing Resolution Along Multiple Imaging Dimensions Using Assorted Pixels. "IEEE TRANSACTIONS ON PATTERN ANALYSIS AND MACHINE INTELLIGENCE, VOL. 27, NO. 4, APRIL 2005, pp. 518

SUMMARY OF INVENTION

A first object of the present disclosure is to provide a time-of-flight distance measuring device capable of expanding a dynamic range appropriately without being restricted by a receiving state of reflected light, optical design of received light, and an arrangement of pixels. A second object of the present disclosure is to provide a time-of-flight distance measuring device capable of increasing a frame rate of short time exposure appropriately while expanding a dynamic range appropriately.

According to a first aspect of the present disclosure, a light emitting element emits modulated light modulated by a pattern having a repeating period to a space. A driving unit drives the light emitting element. A light receiving element distributes an electric charge according to incident light including reflected light of the modulated light reflected by a target by using a plurality of modulation switches and stores the electric charge in a plurality of storage capacitors. A control unit controls driving of the plurality of the modulation switches. A distance measurement value acquiring unit calculates a distance from an own device to the target by using a value sampled by the light receiving element to acquire a distance measurement value.

The control unit controls the driving of the plurality of the modulation switches such that a base exposure period is divided into a plurality of sub exposure periods, and holds without resetting the electric charge stored during the sub exposure period for a one round period which is one round of the divided sub exposure periods. The distance measurement value acquiring unit acquires the distance measurement value of short time exposure from an amount of the electric charge stored during the one round period, and acquires the distance measurement value of long time exposure by integrating the amount of the electric charge stored during a plurality of the one round periods.

According to the first aspect, it is different from a method for grouping a plurality of pixels into a group of long time exposure and a group of short time exposure to acquire a distance measurement value of the long time exposure and a distance measurement value of the short time exposure, and it is formed to acquire both of a distance measurement value of the long time exposure and a distance measurement value of the short time exposure from one pixel (the same pixel) by dividing a base exposure period into a plurality of sub exposure periods. With this, a dynamic range can be expanded without being restricted by a receiving state of reflected light, optical design of received light, and an arrangement of pixels. In particular, it is suitable to an on-vehicle device or the like in which at least one of the own device and the target is moved.

According to a second aspect of the present disclosure, a light emitting element emits modulated light modulated by a pattern having a repeating period to a space. A driving unit drives the light emitting element. A plurality of light receiving elements receive incident light including reflected light of the modulated light reflected by a target, each of the receiving elements forming a pixel within a plane. A control unit controls storing an electric charge in the plurality of the light receiving elements and reading out the electric charge from the plurality of the light receiving elements. A distance measurement value acquiring unit calculates a distance from an own device to the target by using the electric charge read by the control unit from the plurality of the light receiving elements to acquire a distance measurement value. In this case, the control unit groups the plurality of the light receiving elements into several pixel groups and controls the driving of the plurality of the light receiving elements such that, in a period during which the distance measurement value acquiring unit performs one acquisition of the distance measurement value due to the light receiving elements belonging to one pixel group one performing a long time exposure once, the distance measurement value acquiring unit performs a plurality of acquisitions of the distance measurement value due to the light receiving elements belonging to other pixel groups performing a short time exposure multiple times.

According to the second aspect, the dynamic range can be expanded by distributing a plurality of the pixels within a plane into a pixel group which performs long time exposure and a pixel group which performs short time exposure. The light receiving element of the pixel group which performs the short time exposure acquires the distance measurement value a plurality of times by a plurality of times of the short time exposure in a period in which the light receiving element of the pixel group which performs the long time exposure acquires the distance measurement value one time by one time of the long time exposure, and thereby a frame rate of the short time exposure can be increased. With this, the frame rate of the short time exposure can be increased appropriately while expanding the dynamic range appropriately. In particular, it is suitable to the on-vehicle device or the like in a state in which at least one of the own device and the target is moved.

EMBODIMENTS FOR CARRYING OUT INVENTION

Hereinafter, one embodiment in which the present disclosure is applied to, for example, an on-vehicle time-of-flight distance measuring device mounted on a vehicle will be described with reference to drawings. A distance from an own device to a target is calculated, and the target may be, for example, a person, a vehicle, a wall, or the like.
(First Embodiment)

Figure 31:
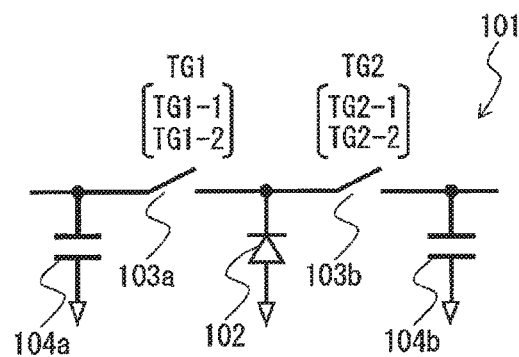
FIG. 31 illustrates a configuration of a light receiving element (a configuration of two capacitors) according to a reference example.
Figure 32:
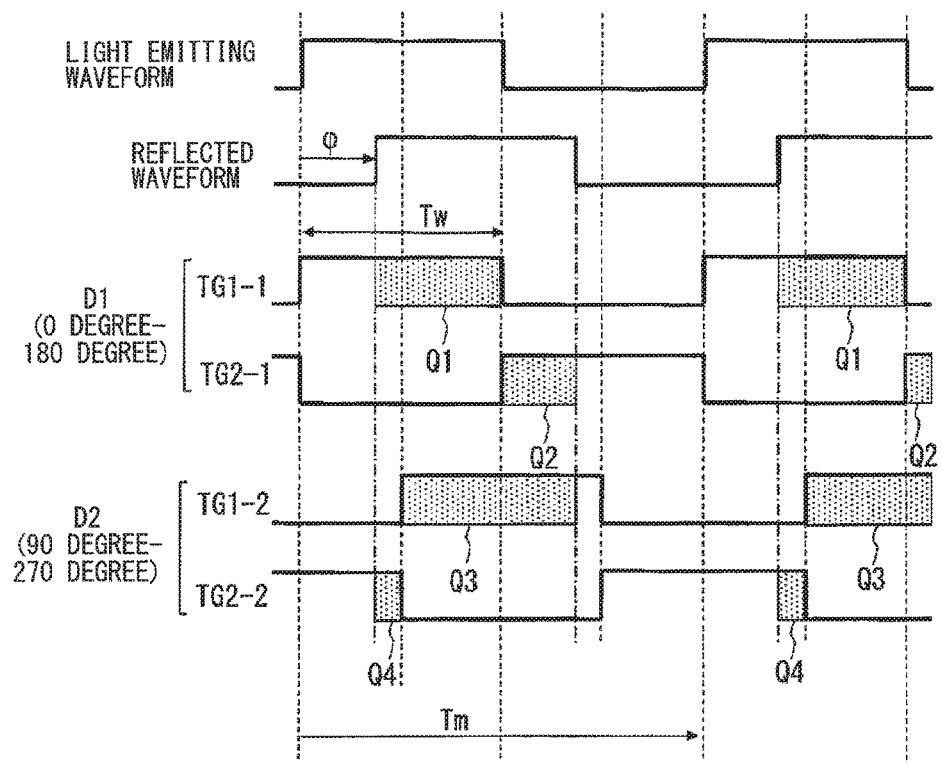
FIG. 32 illustrates a sequence of two capacitors/four phases distance measurement according to the reference example.
Figure 33:
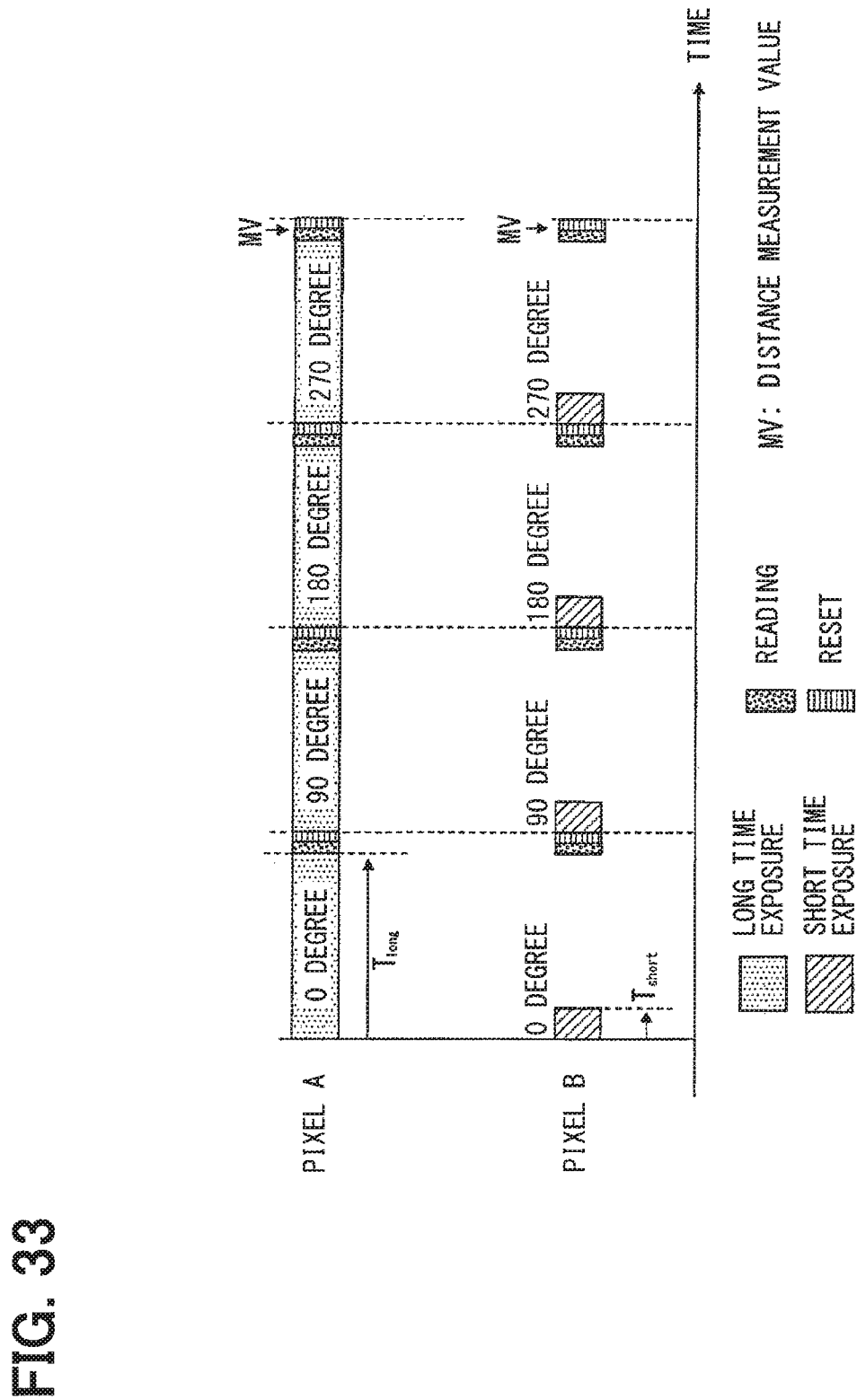
FIG. 33 is a timing chart in which multiple exposure is performed according to the reference example.
Figure 34:
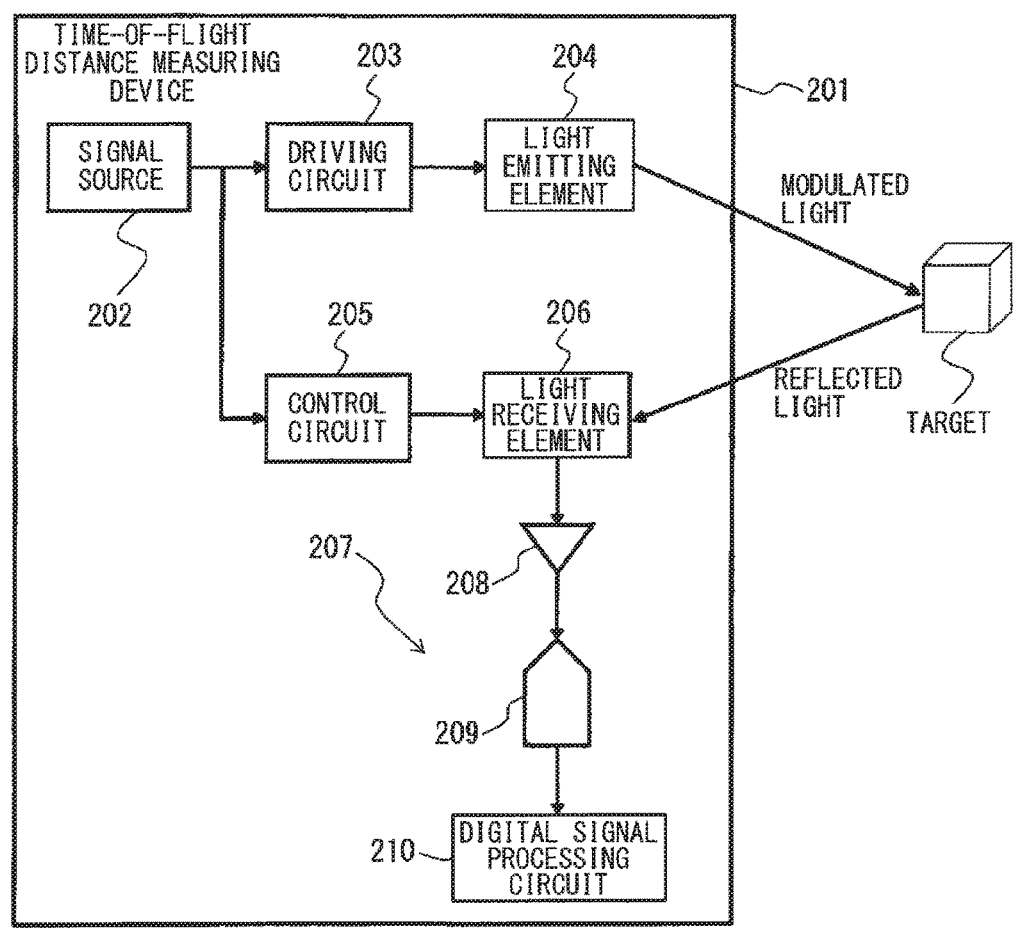
FIG. 34 is a functional block diagram illustrating a configuration of single end output according to a second embodiment of the present disclosure.

At first, a case in which four phases distance measurement is performed will be described as one example by using a reference example illustrated in FIG. 31 and FIG. 32 for facilitating understanding of a technical meaning of a time-of-flight distance measuring device according to a first embodiment of the present disclosure. In the reference example, a light receiving element 101 includes a PD (Photodiode) 102, two modulation switches 103a, 103b, and two storage capacitors 104a, 104b. In the reference example, as illustrated in FIG. 33, for example, a group of a pixel A performs long time exposure by repeating thousand times of driving and a group of a pixel B performs short time exposure by repeating hundred times of driving, and thereby a dynamic range is expanded by 20 dB.

However, the method according to the reference example is based on the premise that the pixel A and the pixel B adjacent to each other receive the same reflected light. Thus, design of a lens for collecting light on the light receiving element is difficult. In a case in which the design of the lens cannot fulfill the premise described above, a fixed pattern dependent on an arrangement of the pixels is generated. In a configuration in which the group of the pixel A and the group of the pixel B are not grouped into rows but are arranged (coexists) in the same row, a wiring might become complicated.

Figure 1:
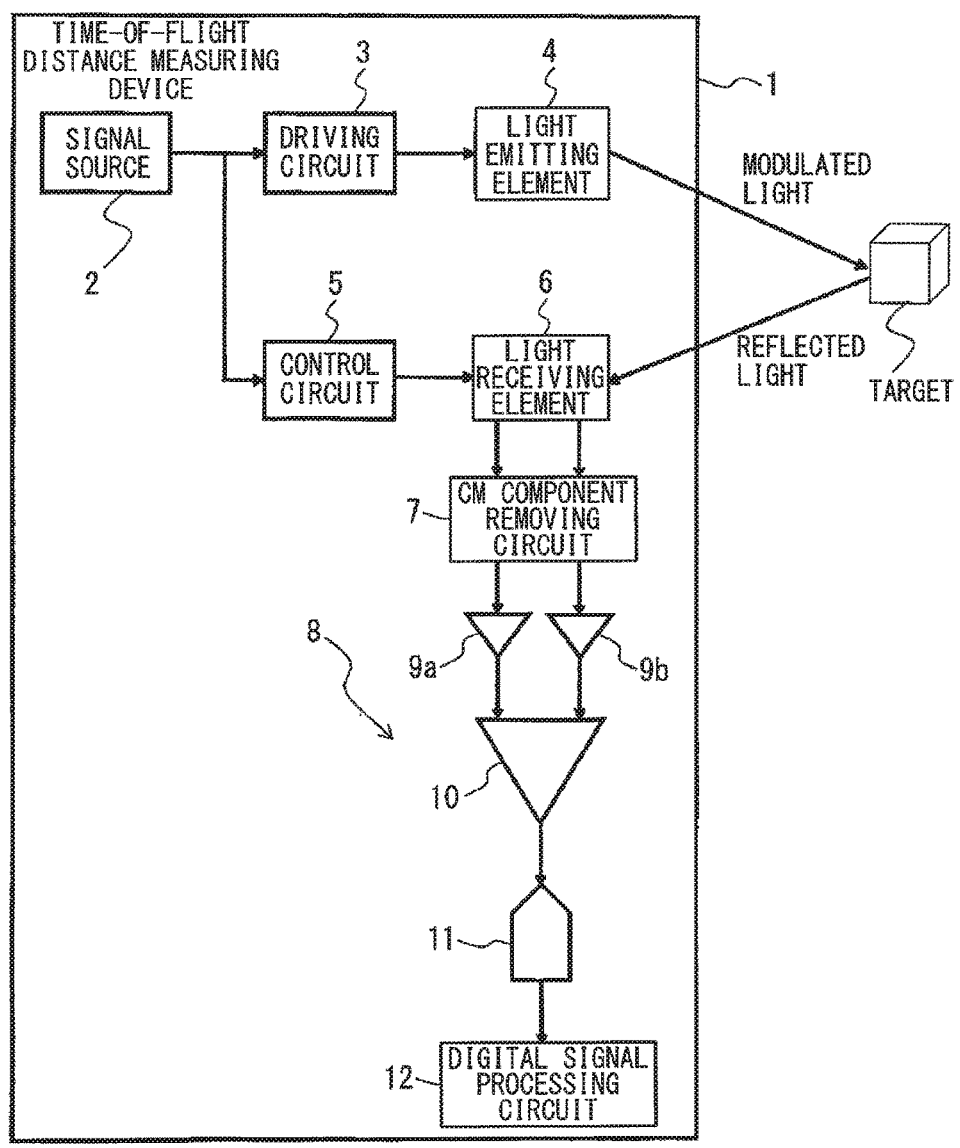
FIG. 1 is a functional block diagram illustrating a first embodiment of the present disclosure.

Based on the problem described above, the embodiment of a time-of-flight distance measuring device capable of expanding a dynamic range appropriately without being restricted by a receiving state of reflected light, optical design of received light, and an arrangement of pixels will be described below. As illustrated in FIG. 1, a time-of-flight distance measuring device 1 according to the first embodiment includes a signal source 2, a driving circuit 3 (driving unit), a light emitting element 4, a control circuit 5 (control unit), a light receiving element 6, a CM (Common Mode) component removing circuit 7, and a distance measurement value acquiring circuit 8 (distance measurement value acquiring unit). The distance measurement value acquiring circuit 8 includes buffers 9a, 9b, a difference detection circuit 10, an AD converter circuit 11, and a digital signal processing circuit 12.

The signal source 2 establishes synchronization between the light emitting element 4 and the light receiving element 6 by outputting a driving signal to the driving circuit 3 and the control circuit 5 and controls exposure of the light receiving element 6 while synchronizing the light receiving element 6 with modulated light emitted from the light emitting element 4. The driving signal output from the signal source 2 may be formed by a rectangular pulse (normally, several to several tens of MHz) that drives the light emitting element 4 and the light receiving element 6, or alternatively formed by only a synchronous pulse. The light emitting element 4 is formed by an LD (Laser Diode) or an LED (Light Emitting Diode) that emits the modulated light, for example, infrared light. The light receiving element 6 is formed by an image sensor using a process of, for example, a CMOS (Complementary Metal Oxide Semiconductor) or a CCD (Charge Coupled Device).

Figure 2:
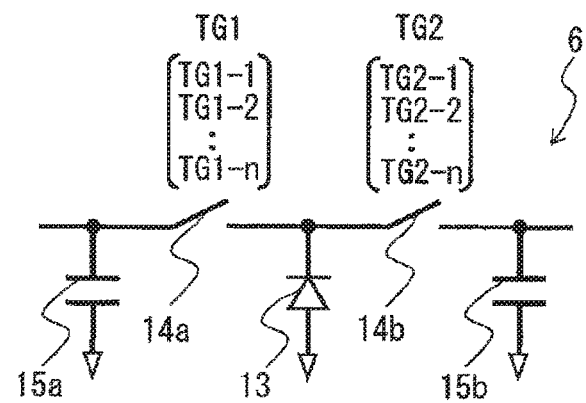
FIG. 2 illustrates a configuration of a light receiving element (a configuration of two capacitors).

As illustrated in FIG. 2, the light receiving element 6 includes a PD (Photodiode) 13, two modulation switches 14a, 14b, and two storage capacitors 15a, 15b. Each of the two modulation switches 14a, 14b is formed by, for example, a MOS type device such as a MOS transistor or a transfer gate, a CCD structural device, or the like. Each of the two storage capacitors 15a, 15b is formed by, for example, a capacitance element such as a MOS, a CCD, and a MIM (Metal Insulator Metal), a wiring, a parasitic capacitor of a PN junction, or the like. The light receiving element 6 drives the modulation switches 14a, 14b by using control signals (gate signals) TG1, TG2 and distributes electric charge caused by the received incident light into the storage capacitors 15a, 15b and outputs a signal indicative of an amount of the distributed electric charge into the CM component removing circuit 7. Since each of the control signals TG1, TG2 is formed to be synchronized with the modulated light, the amount of the electric charge distributed into the storage capacitors 15a, 15b is changed in accordance with a distance between the own device and the target. In FIG. 2, the two storage capacitors 15a, 15b are illustrated as an example; however three or more storage capacitors may be arranged.

The CM component removing circuit 7 is to avoid the saturation of the pixels due to the electric charge caused by background light in a case in which the background light which cannot be ignored against the emitting modulated light exists. As a method to remove a CM component, various techniques are disclosed in prior art literatures. For example, the techniques are disclosed in U.S. Pat. No. 6,919,549 B2, DE 102005056774 A1, EP 1622200 A1, and the like. The difference detection circuit 10 detects a difference of the signal input from the CM component removing circuit 7 via the buffers 9a, 9b and outputs a signal according to the detected difference into the AD converter circuit 11. Each of the buffers 9a, 9b is achieved by, for example, a source follower circuit as its simple configuration. The difference detection circuit 10 is achieved by, for example, a differential amplifier.

The AD converter circuit 11 converts the signal input from the difference detection circuit 10, which is an analog signal, into a digital signal and outputs the digital signal into the digital signal processing circuit 12. The digital signal processing circuit 12 processes the digital signal input from the AD converter circuit 11 and calculates the distance between the own device and the target from the amount of the electric charge distributed into the storage capacitors 15a, 15b and acquires the distance measurement value (measures the distance).

Figure 3:
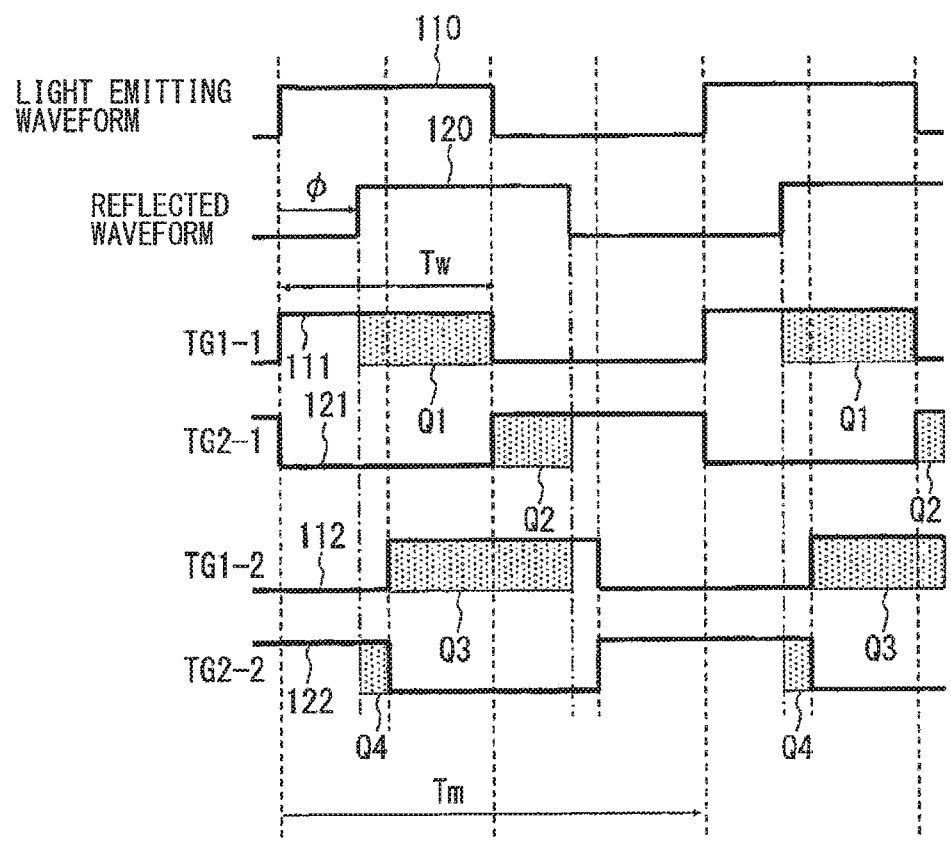
FIG. 3 illustrates a sequence of two capacitors/four phases distance measurement.

FIG. 3 illustrates a sequence (modulation cycle: Tm, exposure period: Tw) in which four phases distance measurement is performed as a duty cycle of the light emitting waveform is set to be 50% (the light receiving element 6 is driven in four phases). A waveform of the modulated light emitted from the light emitting element 4 (light emitting waveform 110) is modulated by a rectangular wave synchronized with the control signals TG1, TG2. FIG. 3 illustrates a case in which the waveform is modulated by the rectangular wave as an example; however the waveform may be modulated by a sine wave, a triangular wave, or a waveform of a pseudorandom sequence or the like. A waveform of the reflected light of the modulated light reflected by the target (reflected waveform 120) has a time difference against the light emitting waveform 110 and therefore the waveform of the reflected light is delay against the light emitting waveform 110 by a phase difference cp. On the other hand, the control signals TG1, TG2 are driven by rectangular waves having phases different from each other by 180 degrees. The digital signal processing circuit 12 repeats a sequence, which is driven by control signals TG1-1, TG2-1 (driving waveforms 111, 121), several ten times to several hundred thousand times and then acquires information of generated electric charges Q1, Q2 (voltage value applied to electric charge voltage conversion). After that, the digital signal processing circuit 12 repeats a sequence, which is driven by control signals TG1-2, TG2-2 (driving waveforms 112, 122), several ten times to several hundred thousand times similarly and then acquires information of generated electric charges Q3, Q4. The digital signal processing circuit 12 calculates a presumption value θ of the phase difference φ from the acquired Q1 to Q4 on the basis of Expression (1) described below by using the discrete Fourier transform (DFT).

$$\theta = \tan^{-1}[(Q1-Q3)/(Q2-Q4)] \quad (1)$$

Expression (1) is an expression for the phase difference based on the four samplings described above, however the presumption value θ of the phase difference φ with respect to a general N phase (hereinafter, referred to as phase difference θ) can be calculated by Expression (2) described below.

$$\theta = \tan^{-1}[(\Sigma Qk \times \sin(2\pi N \times k))(\Sigma Qk \times \cos(2\pi/N \times k))] \quad (2)$$

Figure 4:
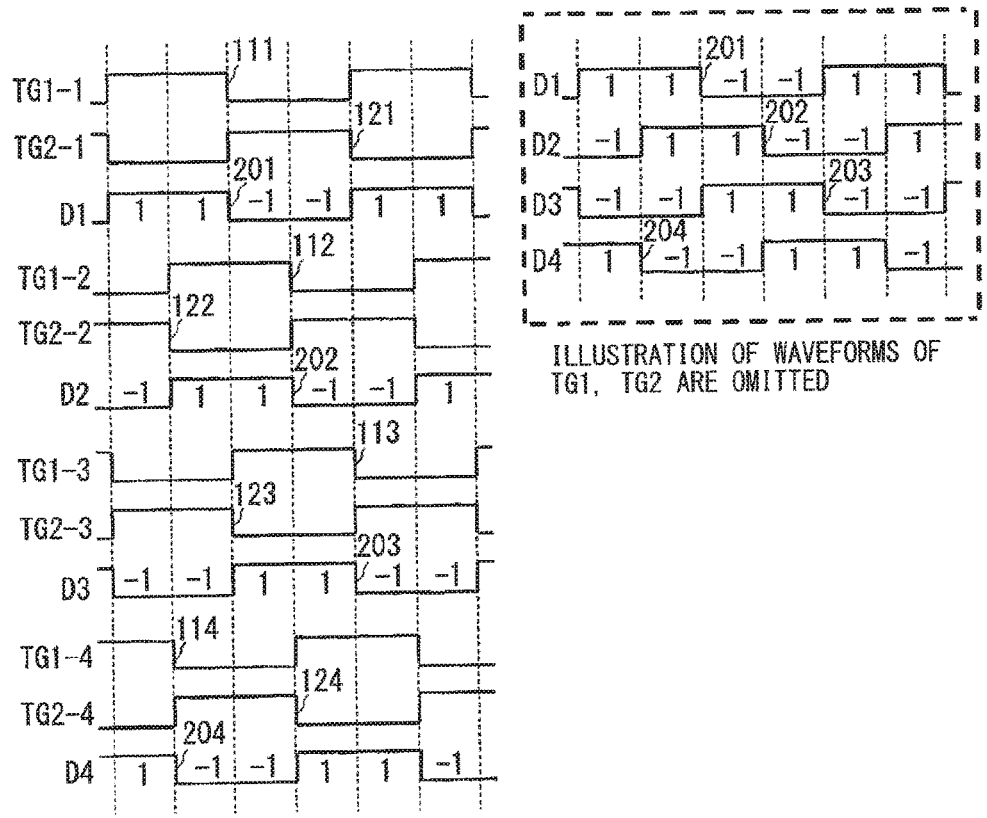
FIG. 4 illustrates a sequence of differential output.

FIG. 4 illustrates a sequence of differential output. The difference detection circuit 10 generates a digital value D1 (201) by repeating a combination of the control signals TG1, TG2, for example, control signals TG1-1 (the driving waveform 111), TG2-1 (the driving waveform 121), several ten times to several hundred thousand times. Similarly, the difference detection circuit 10 generates a digital value D2 (202) from the control signals TG1-2 (the driving waveform 112), TG2-2 (the driving waveform 122) and generates a digital value D3 (203) from the control signals TG1-3 (the driving waveform 113), TG2-3 (the driving waveform 123) and generates a digital value D4 (204) from the control signals TG1-4 (the driving waveform 114), TG2-4 (the driving waveform 124). In this case, the difference detection circuit 10 outputs the digital values D1 to D4 as values from which the DC component is removed. When the control signal TG1 is "H" and the control signal TG2 is "L", each of the digital values D1 to D4 is set to "1", and when the control signal TG1 is "L" and the control signal TG2 is "H", each of the digital values D1 to D4 is set to "−1". That is, a state of each the control signals TG1, TG2 is unambiguously determined by whether the value relating to the waveform of Dx is "1" or "−1". In this way, Dx is a signal indicative of the difference between the two storage capacitors 15a, 15b, and therefore the AD converter circuit 11 outputs the signal subjected to the calculation corresponding to a numerator or a denominator in Expression (1) described above.

In a case in which such a phase type time-of-flight distance measuring device 1 is used on a vehicle or the like, expansion of the dynamic range is required. Hereinafter, a method for expanding the dynamic range according to the present disclosure will be described.

Figure 5:
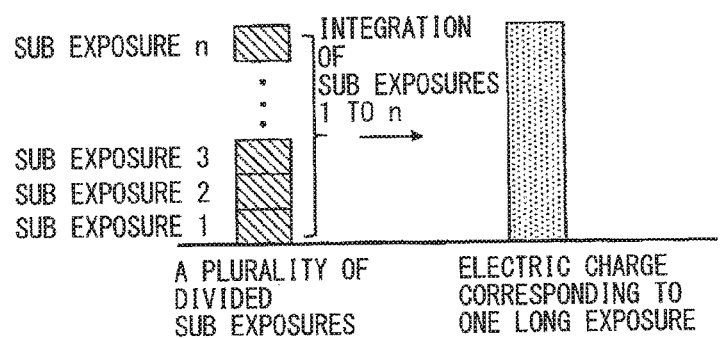
FIG. 5 illustrates a concept of the present disclosure.
Figure 6:
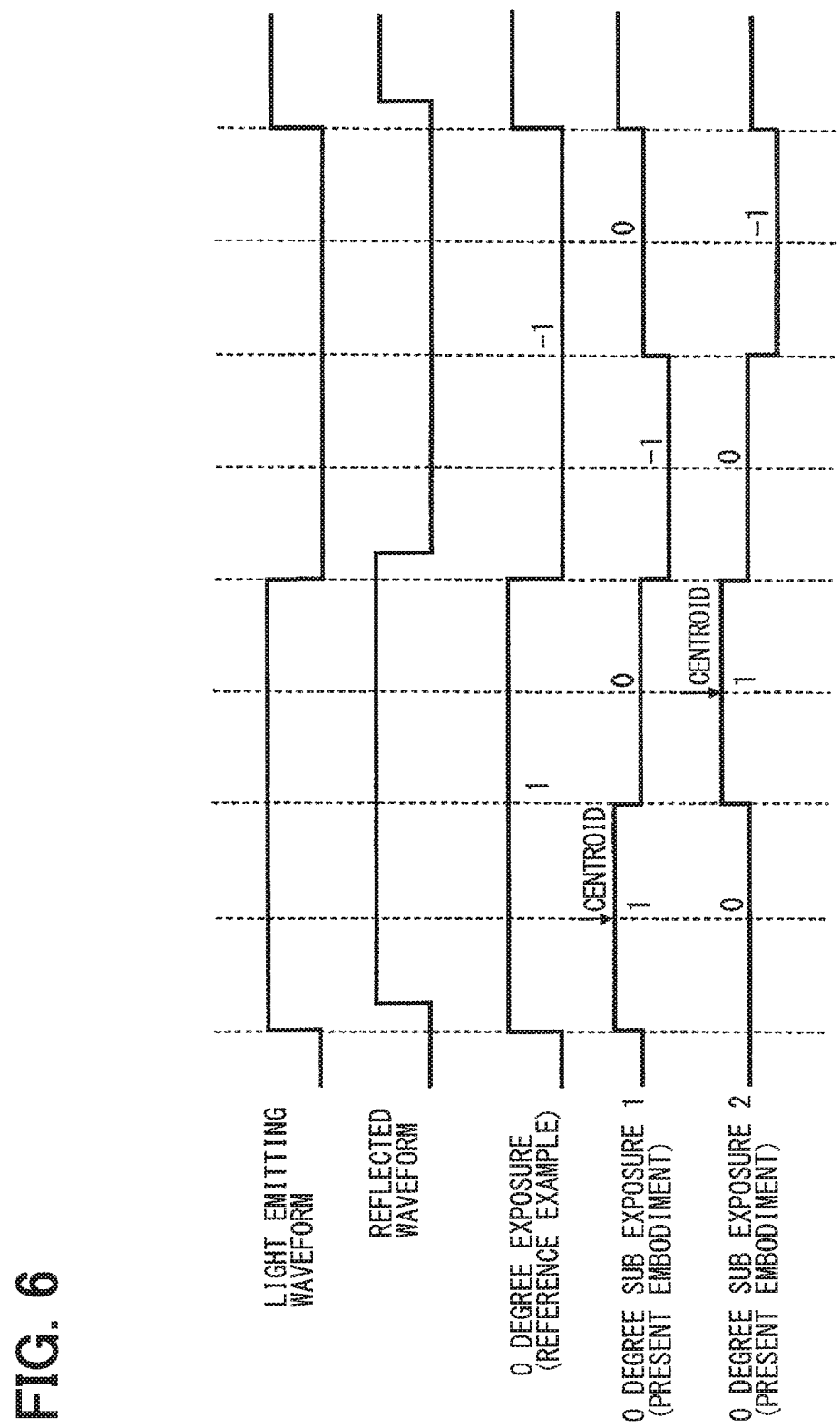
FIG. 6 illustrates a sequence in which exposure of four phases distance measurement is achieved by means of two divided sub exposure.
Figure 7:
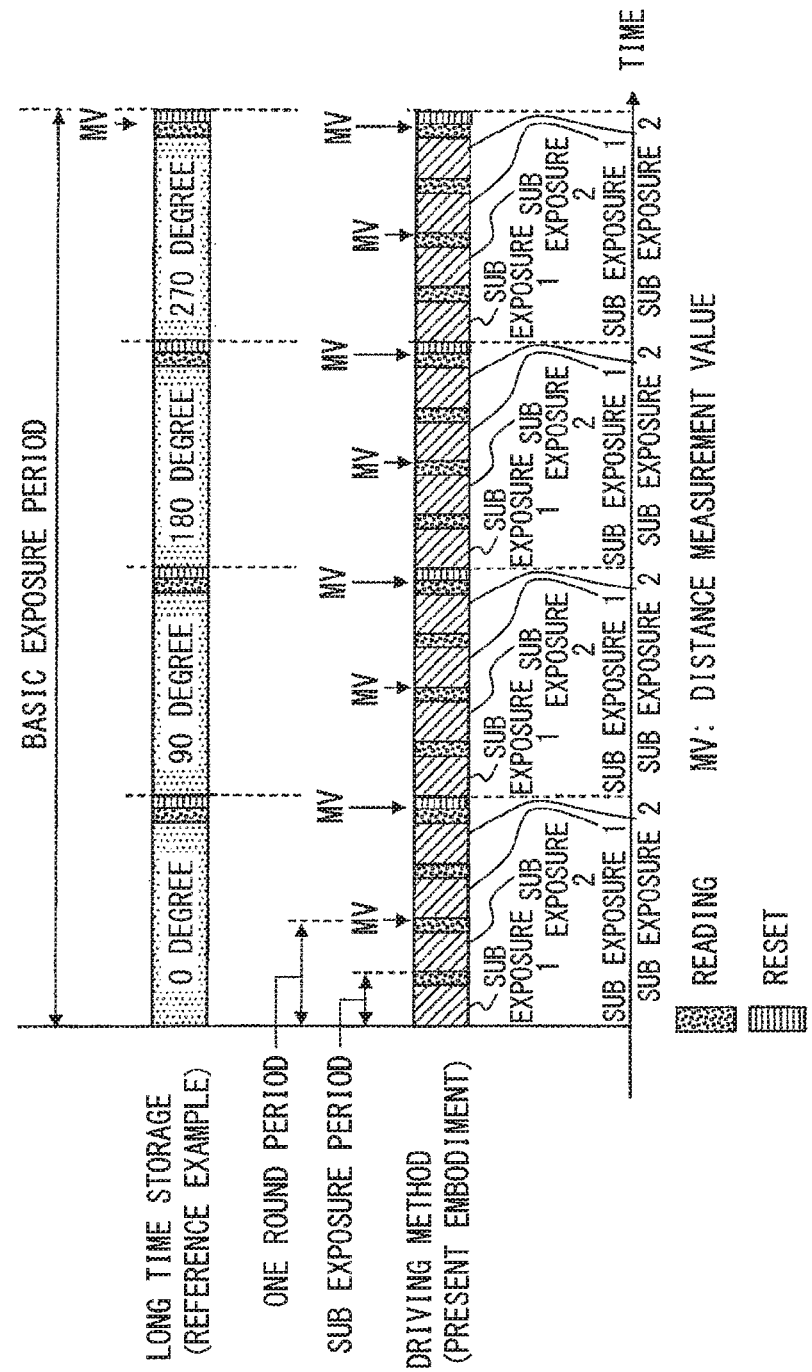
FIG. 7 is a timing chart in which the exposure of the four phases distance measurement is achieved by means of the two divided sub exposure.

FIG. 5 illustrates a concept of the present disclosure. The present disclosure acquires the distance measurement value of the short time exposure by dividing a base exposure period corresponding to a period of the long time storage in the reference example described above into a plurality of sub exposure periods and acquires the distance measurement value of the long time exposure equivalent to the exposure (long time exposure) in the reference example. FIG. 6 illustrates a sequence in which exposure of four phases distance measurement in the reference example is achieved by means of two divided sub exposure, and FIG. 7 illustrates a timing chart thereof. An electric charge storage equivalent to the exposure in the reference example is achieved by driving the sub exposures 1, 2 by a waveform with a duty cycle of 25% and repeating the sub exposures 1, 2 several ten times to several hundred thousand times respectively and integrating the electric charge without resetting the electric charge between the sub exposures. The distance measurement value of the short time exposure can be acquired (renewed at high speed) from the amount of the electric charge stored during a period of one round of the divided sub exposure periods (during one round period). The distance measurement value of the long time exposure can be acquired by integrating the electric charge stored during a plurality of times of one round periods. That is, by setting the timing when the electric charge (output value) stored in one pixel (the same pixel) is read appropriately, both of the distance measurement value of the short time exposure and the distance measurement value of the long time exposure can be acquired from one pixel and the dynamic range can be expanded.

Figure 8:
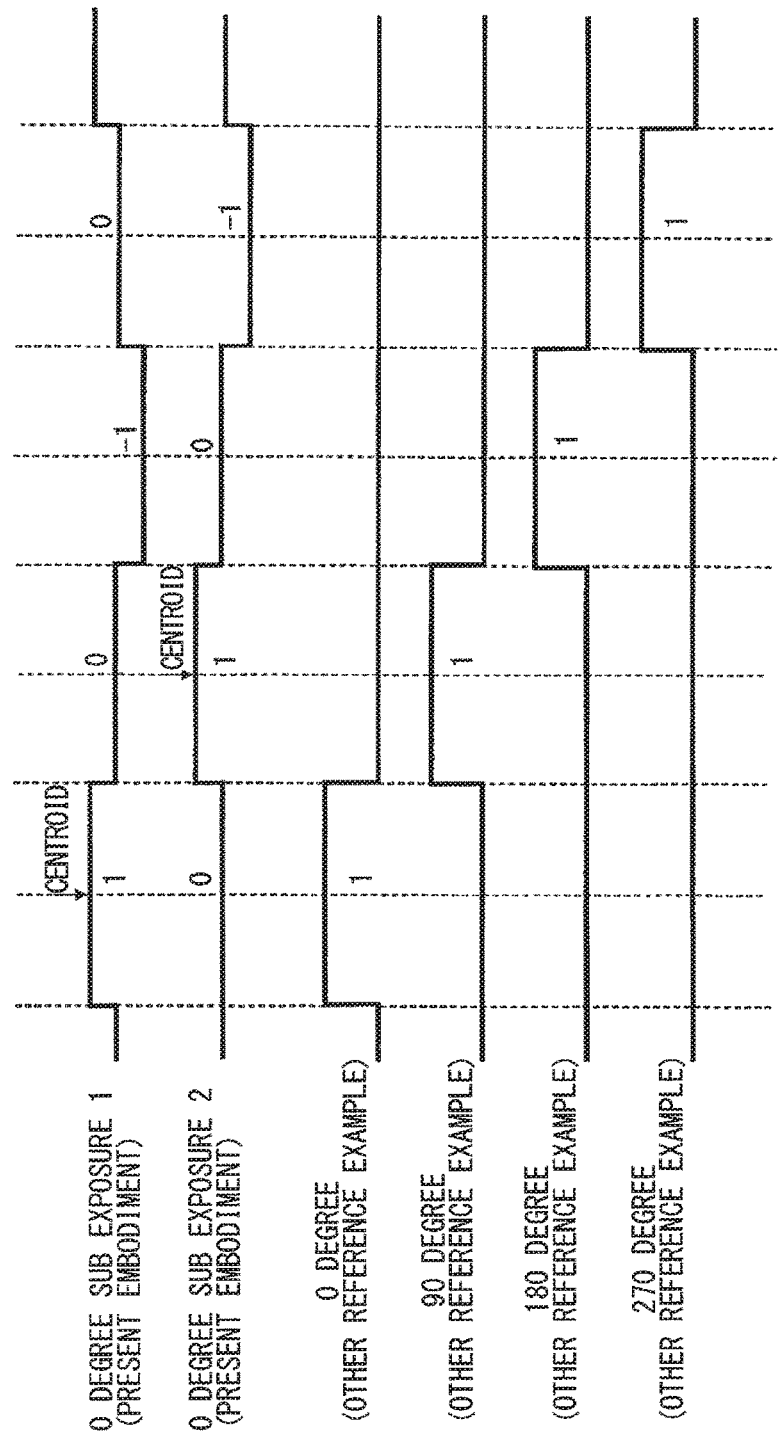
FIG. 8 illustrates a sequence of a principle of acquiring a distance measurement value from the two divided sub exposure.

FIG. 8 illustrates a principle of acquiring the distance measurement value from the two sub exposures. As a premise, apart from a case in which the two capacitors/four phases distance measurement is performed as illustrated in FIG. 31 described above, there is a case in which four capacitors/four phases distance measurement is performed (another reference example). When the sequence in FIG. 6 in which the exposure of the four phases distance measurement is achieved by the two divided sub exposure according to the reference example is compared to the sequence in which the four capacitors/four phases distance measurement is performed according to the reference example, the sub exposure 1 illustrated in FIG. 6 corresponds to exposure of 0 degree to 180 degrees in the sequence in which the four capacitors/four phases distance measurement is performed, and the sub exposure 2 corresponds to exposure of 90 degrees to 270 degrees in the sequence in which the four capacitors/four phases distance measurement is performed. The sub exposures 1, 2 correspond to a numerator and a denominator in Expression (3) described below which calculates the phase difference θ of the four phases distance measurement.

[Expression 1]

$$\theta = \tan^{-1}\frac{a_0 - a_{180}}{a_{90} - a_{270}} \quad (3)$$

Accordingly, the phase difference can be calculated by calculating a ratio of a sampling value of the sub exposure 1 and a sampling value of the sub exposure 2 and calculating arctangent of the ratio (Expression (3) is equivalent to Expression (1).

FIG. 8 illustrates a case in which the sub exposure is based on the four phases, however a similar way of thinking is applied to a general N phase (N is a natural number). In general, an expression of the discrete Fourier transform is given by Expression (4) described below.

[Expression 2]

$$A_k = \sum_{j=0}^{N-1} a_j e^{-\frac{2\pi i}{N}jk} \quad (4)$$

What is mainly used in the phase type time-of-flight distance measurement is a primary component, and Expression (4) is given by Expression (5) described below.

[Expression 3]

$$A_l = \sum_{j=0}^{N-1} a_j e^{-\frac{2\pi i}{N}j} \quad (5)$$

As N is limited to a multiple of two and N=2M is set, Expression (5) is given by Expression (6) described below.

[Expression 4]

$$\begin{aligned} A_l &= \sum_{j=0}^{N-1} a_j e^{-\frac{2\pi i}{N}j} \\ &= \sum_{j=0}^{M-1} a_j e^{-\frac{2\pi i}{N}j} + \sum_{j=0}^{M-1} a_{M+j} e^{-\frac{2\pi i}{N}(M+j)} \\ &= \sum_{j=0}^{M-1} \left(a_j + a_{M+j} e^{-\frac{2\pi i M}{N}}\right) e^{-\frac{2\pi i}{N}j} \\ &= \sum_{j=0}^{N/2-1} (a_j - a_{N/2+j}) e^{-\frac{2\pi i}{N}j} \end{aligned} \quad (6)$$

Accordingly, the hierarchical distance measurement based on the principle of the present disclosure is formed in any way of dividing by determining the driving waveform of the sub exposure such that the divided sub exposure is to be $a_j - a_{N/2+j}$. Specifically, the driving waveform is determined such that a relationship of the waveforms of 1, −1 is to be 180 degrees in the phase difference.

Examples of a method of achieving "0" in the sequence in FIG. 6 in which the exposure of the four phases distance measurement is achieved by the two divided sub exposure include a first to a third methods described below.

Figure 9:
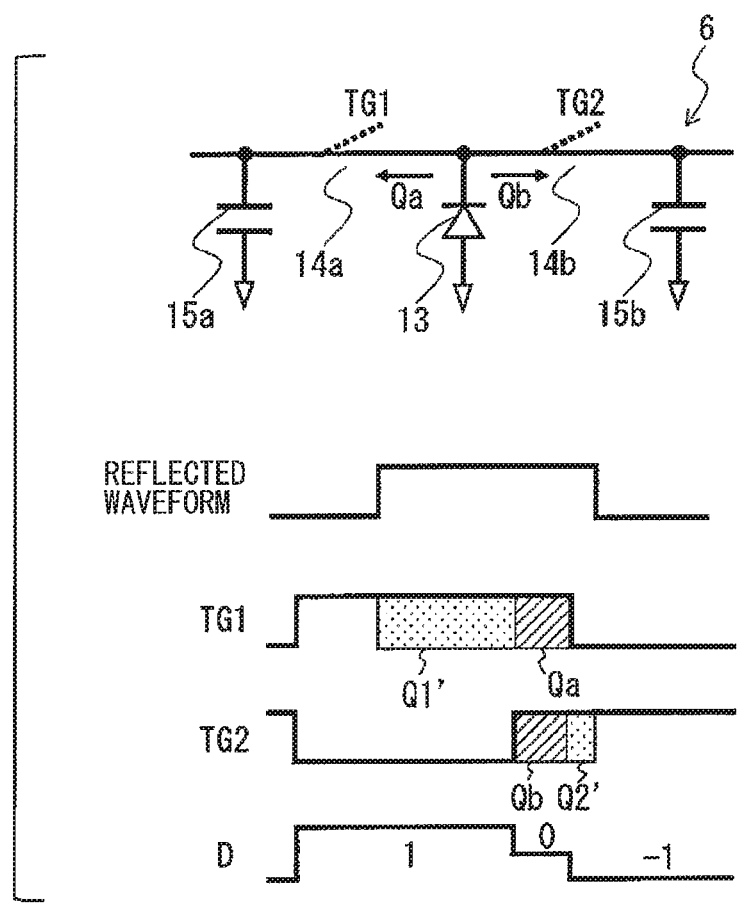
FIG. 9 illustrates a configuration and a sequence which achieve "0" (No. 1).

In the first method, as illustrated in FIG. 9, "0" is achieved by setting a period in which the modulation switches 14a, 14b are set to be ON at the same time, namely the period in which both of TG1 and TG2 are set to be "H". In the period in which both of TG1 and TG2 are set to be "H", the electric charge generated in the PD 13 is divided into Qa and Qb and stored in the storage capacitors 15a, 15b, and therefore Qa and Qb are set to be an equal value. Thus, the component is canceled by the CM component removing circuit 7 and the difference detection circuit 10, and as a result, the AD converter circuit 11 outputs "0".

Figure 10:
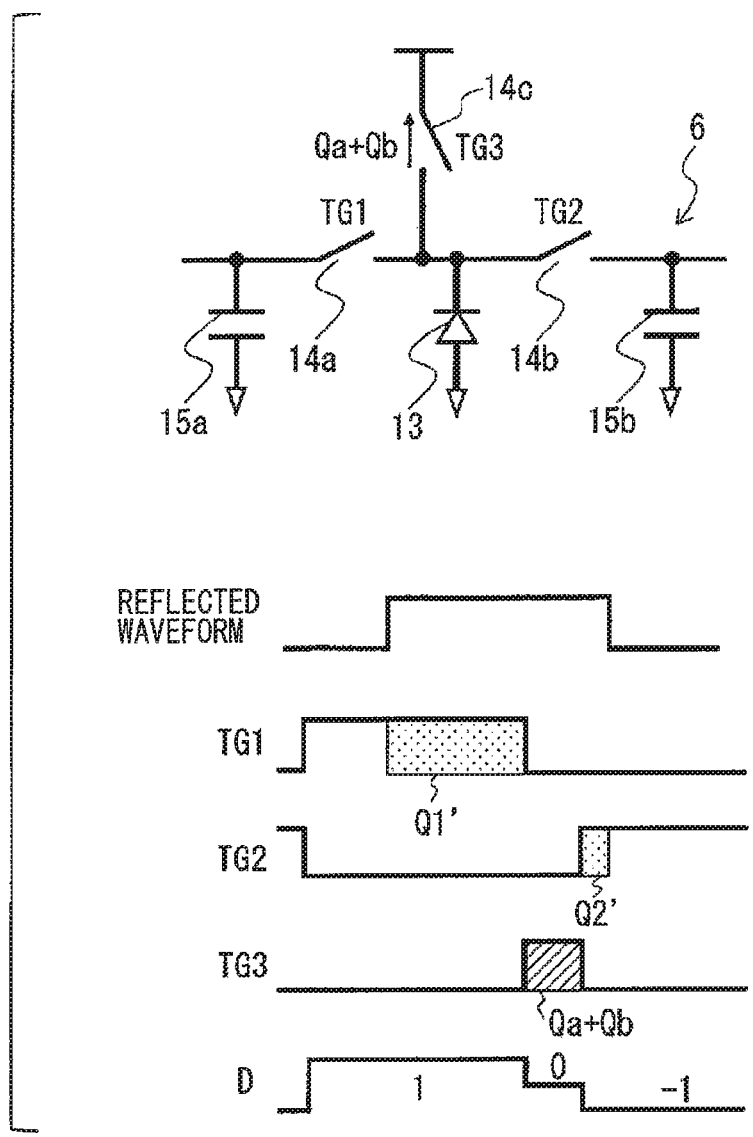
FIG. 10 illustrates a configuration and a sequence which achieve "0" (No. 2).

In the second method, as illustrated in FIG. 10, "0" is achieved by arranging a modulation switch 14c other than the modulation switches 14a, 14b, and by setting a period in which the modulation switches 14a, 14b are set to be OFF at the same time and the modulation switch 14c is set to be ON, namely, the period in which both of TG1 and TG2 are set to be "L" and TG3 is set to be "H". In the period in which both of TG1 and TG2 are set to be "L" and TG3 is set to be "H", the electric charge generated in the PD 13 is discarded to a fixed electric potential (for example, VDD).

Figure 11:
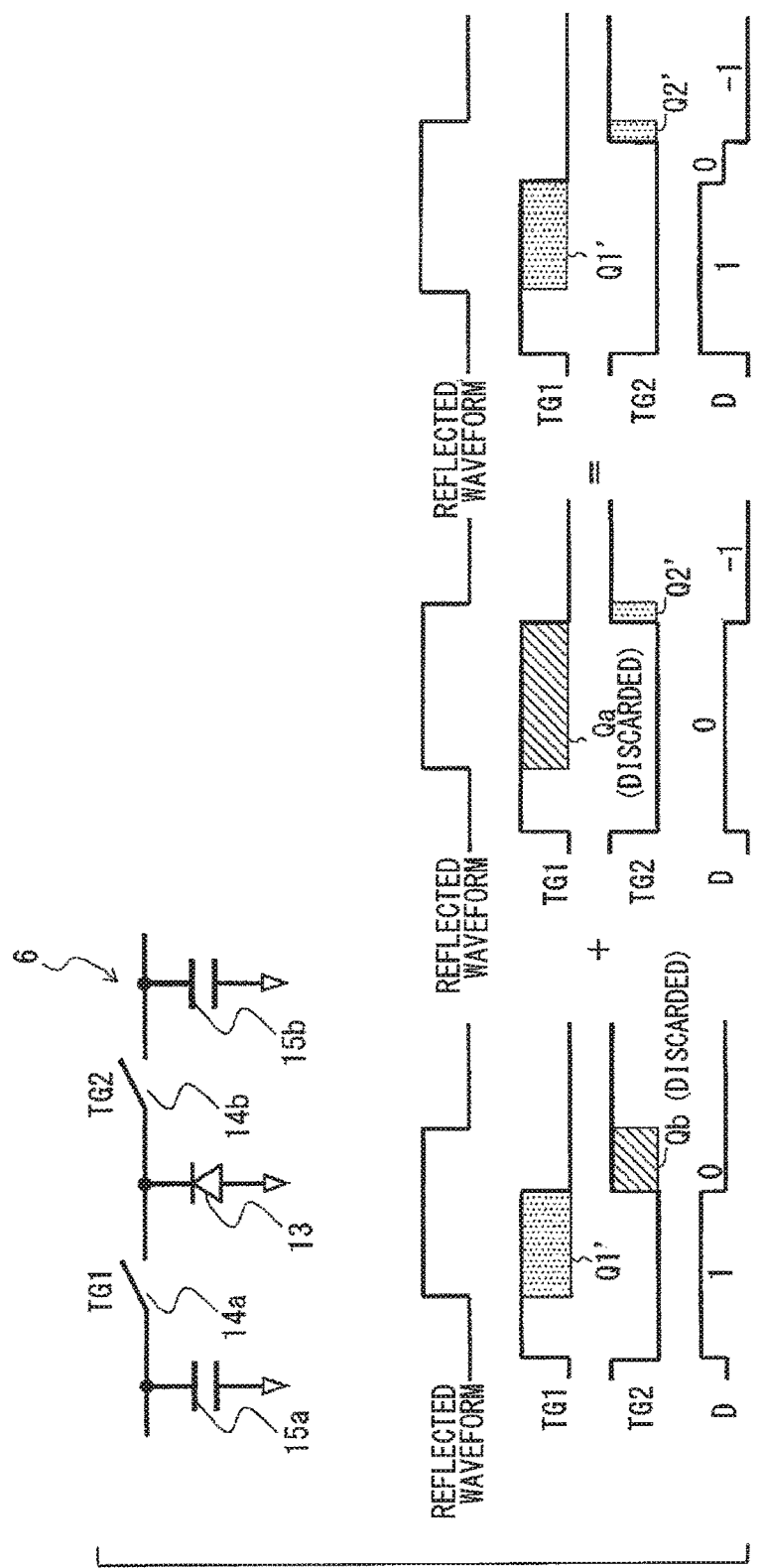
FIG. 11 illustrates a configuration and a sequence which achieve "0" (No. 3).

In the third method, as illustrated in FIG. 11, "0" is achieved by discarding one of Qa and Qb and by integrating the samplings of two times. That is, a cycle in which the electric charge stored during a period in which TG2 is set to be "H" is discarded and a cycle in which the electric charge stored during a period in which TG1 is set to be "H" is discarded are integrated. In the first method described above, it is necessary to set the period in which both of TG1 and TG2 are set to be "H", and in the second method, it is necessary to set the period in which both of TG1 and TG2 are set to be "L", however in the third method, it is not necessary to set such a period, and there is an advantage to merely perform simple control in which TG1 and TG2 are reversed to each other.

Figure 12:
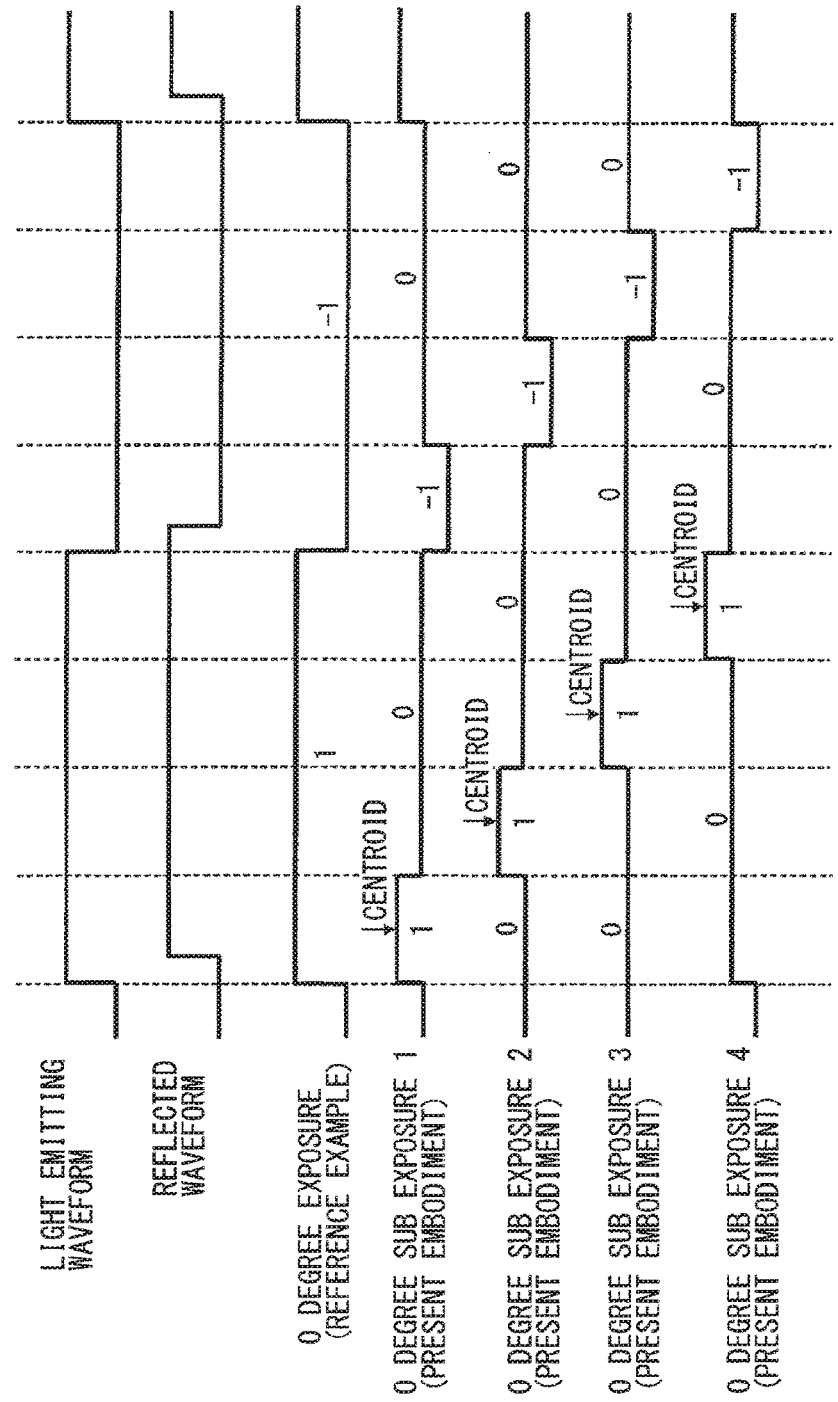
FIG. 12 illustrates a sequence in which the exposure of the four phases distance measurement is achieved by means of four divided sub exposure (No. 1).
Figure 13:
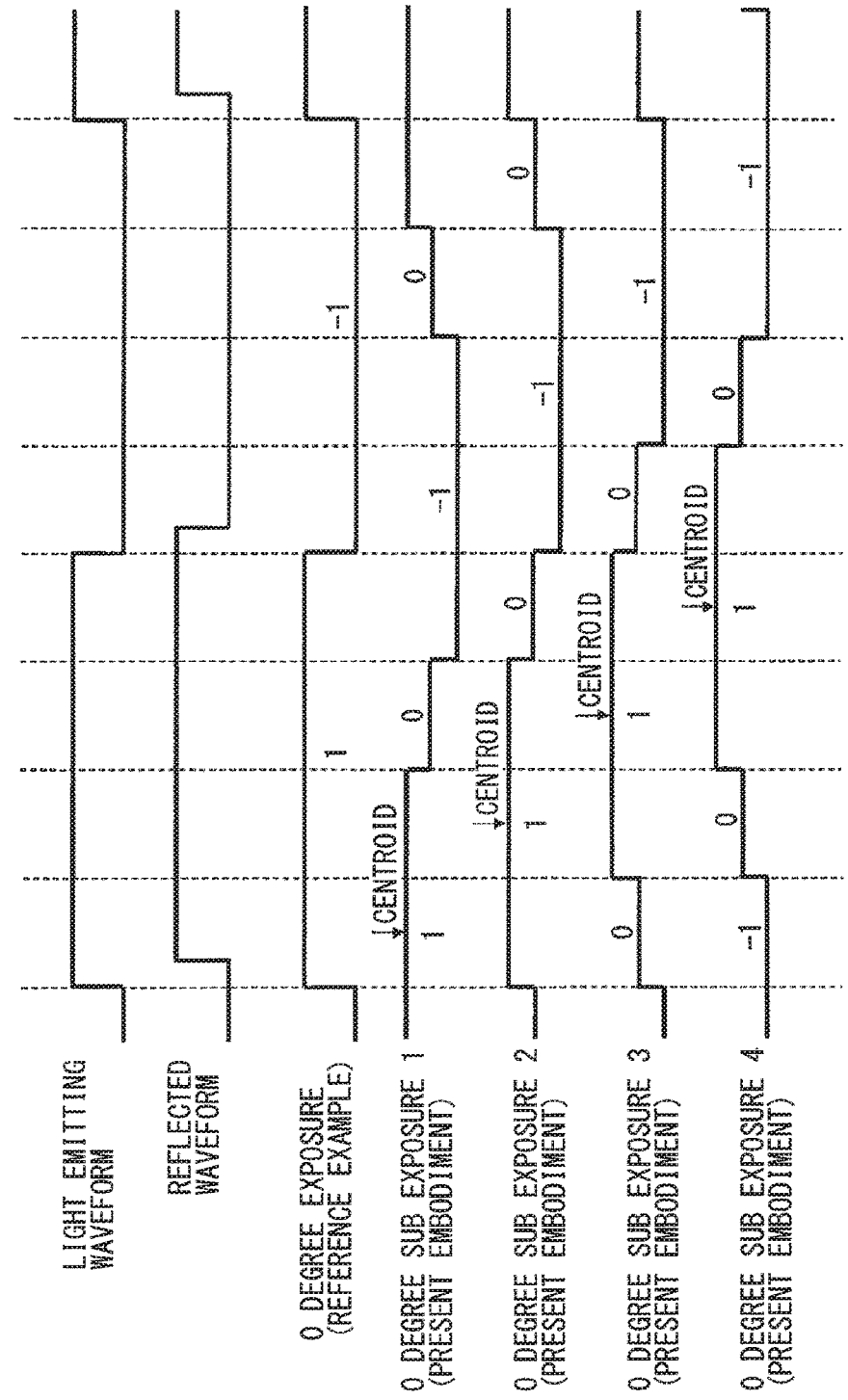
FIG. 13 illustrates a sequence in which the exposure of the four phases distance measurement is achieved by means of the four divided sub exposure (No. 2).
Figure 14:
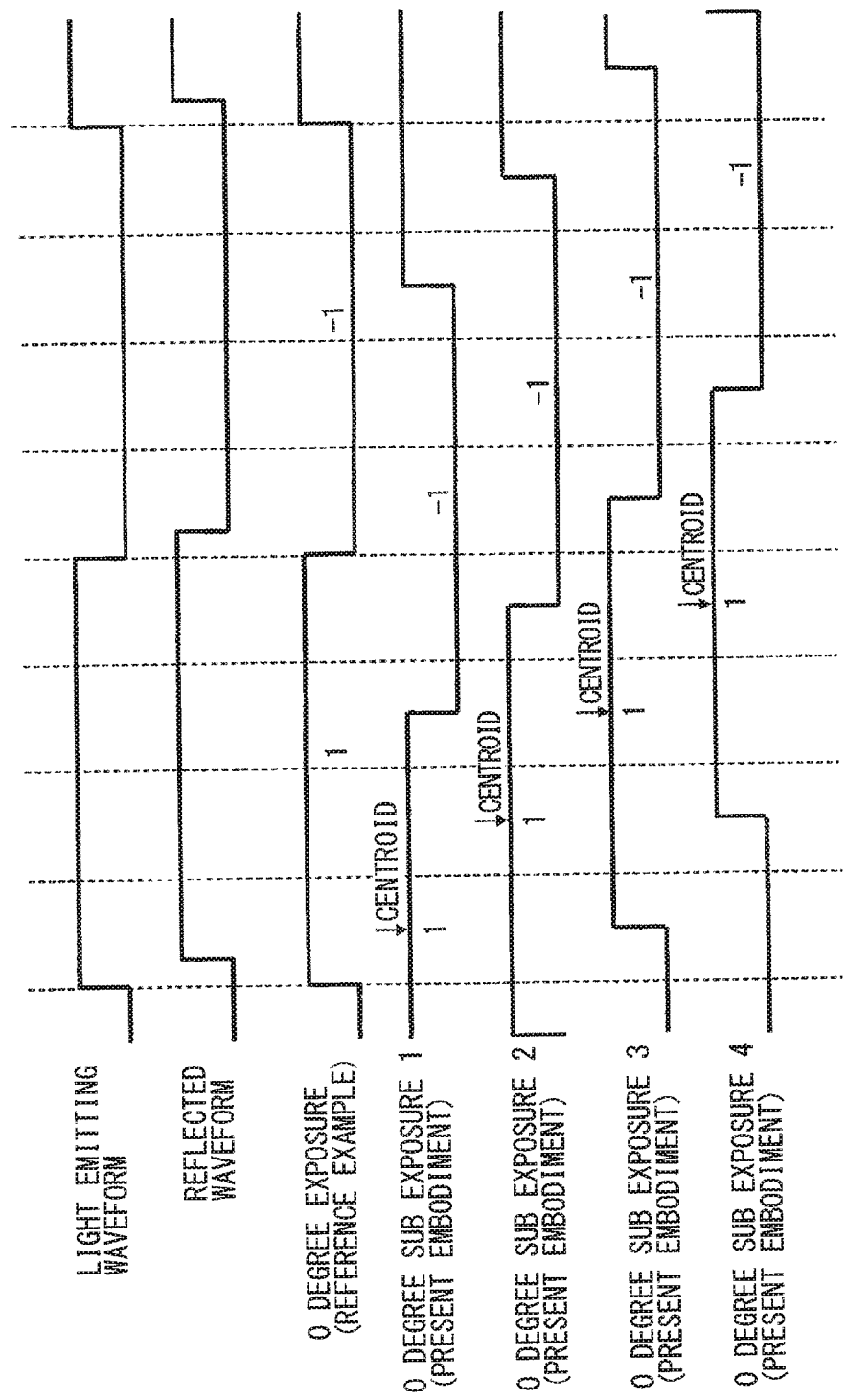
FIG. 14 illustrates a sequence in which the exposure of the four phases distance measurement is achieved by means of the four divided sub exposure (No. 3).

FIG. 12 illustrates a sequence in which exposure of the four phases distance measurement is achieved by four divided sub exposure. In this case, the four phases distance measurement becomes equivalent to an eight capacitors/eight phases distance measurement by driving the sub exposure by a waveform with a duty cycle of 12.5%. FIG. 13 illustrates another sequence in which exposure of the four phases distance measurement is achieved by the four divided sub exposure. In this case, the sub exposure is driven by a waveform with a duty cycle of 37.5%. In FIG. 12, it is necessary to quadruple an exposure time for setting an SNR (signal-to-noise ratio) of a long time storage to be equivalent to that in the method of the reference example, however in FIG. 13, by setting a time in which a signal is integrated in the sub exposure to be longer than that in the sequence illustrated in FIG. 12, the SNR can be improved without quadrupling the exposure time. FIG. 14 illustrates another sequence in which the exposure of the four phases distance measurement is achieved by the four divided sub exposure. In this case, the sub exposure is driven by a waveform with a duty cycle of 50%. In FIG. 12 and FIG. 13, it is necessary to perform control which inserts "0", however in FIG. 14, although the SNR obtained in the same exposure time is less than that obtained in the sequence illustrated in FIG. 13, it is not necessary to perform the control which inserts "0".

Figure 15:
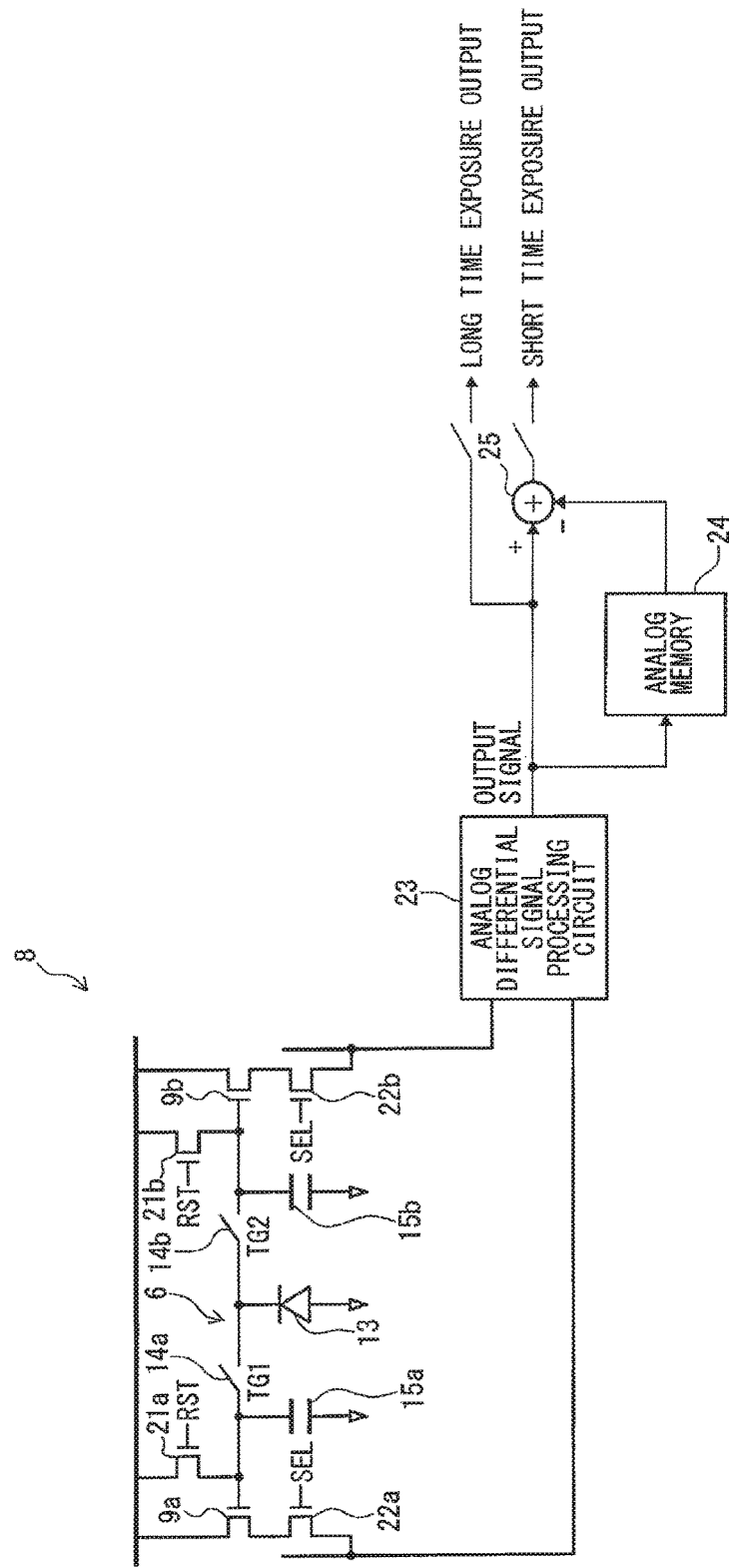
FIG. 15 illustrates a part of a distance measurement value acquiring circuit (No. 1).
Figure 16:
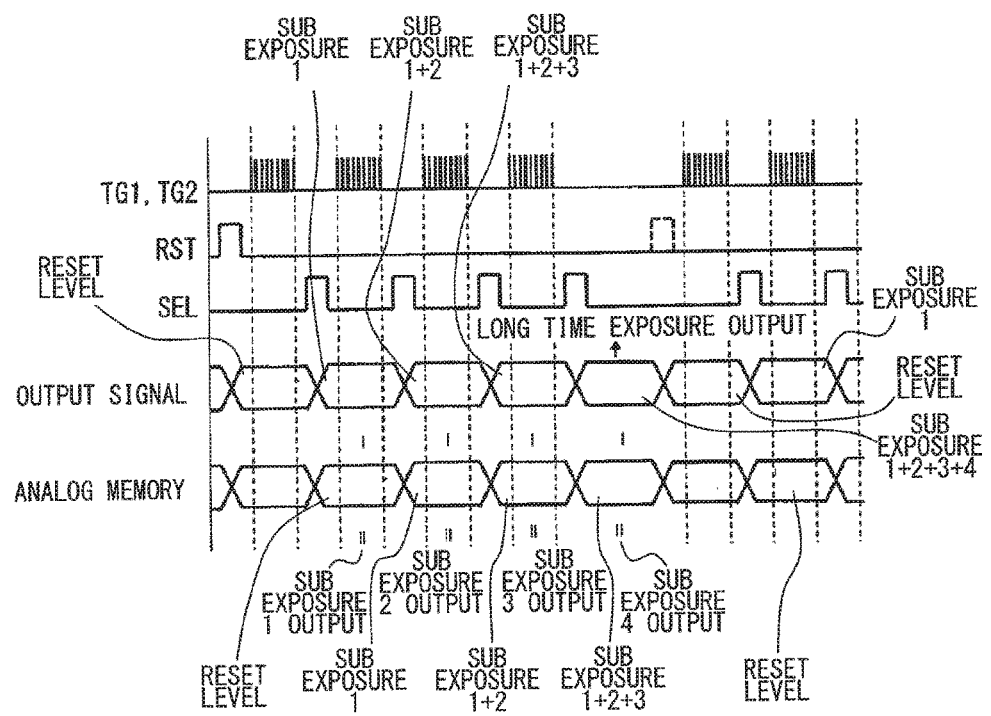
FIG. 16 is a timing chart illustrating output of an output signal (No. 1).

FIG. 15 illustrates a circuit diagram in which a part of the distance measurement value acquiring circuit 8, which is a latter part of the light receiving element 6, is formed by an analog memory, and FIG. 16 illustrates a timing chart of the operation of the circuit. In the distance measurement value acquiring circuit 8, the buffers 9a, 9b, reset switching elements 21a, 21b, selector switching elements 22a, 22b are connected to the light receiving element 6 (the PD 13, the modulation switches 14a, 14b, the storage capacitors 15a, 15b). The buffers 9a, 9b, the switching elements 21a, 21b, and the switching elements 22a, 22b are configured by, for example, a field effect transistor (FET). An analog differential signal processing circuit 23 reads out the amount of the electric charge from the light receiving element 6 by a differential and outputs an output signal to an analog memory 24 and a difference calculation circuit 25. When the analog memory 24 receives the output signal from the analog differential signal processing circuit 23, the analog memory 24 holds an output value of the received output signal, and when the analog memory 24 receives the next output signal, the analog memory 24 outputs an output signal including the holding output value to the difference calculation circuit 25. The difference calculation circuit 25 calculates the difference by subtracting the output value of the output signal input from the analog memory 24 from the output value of the output signal input from the analog differential signal processing circuit 23 and outputs the difference. That is, the distance measurement value acquiring circuit 8 outputs the output signal, which is directly output from the analog differential signal processing circuit 23, as the distance measurement value of the long time exposure and outputs the output signal, which is output from the difference calculation circuit 25, as the distance measurement value of the short time exposure. In such a configuration in which the difference is calculated by the analog circuit, compared to a configuration in which the difference is calculated by a digital circuit described below, an increase of an area of a circuit or an influence of a noise may become a problem, however an influence of a quantization error can be suppressed.

Figure 17:
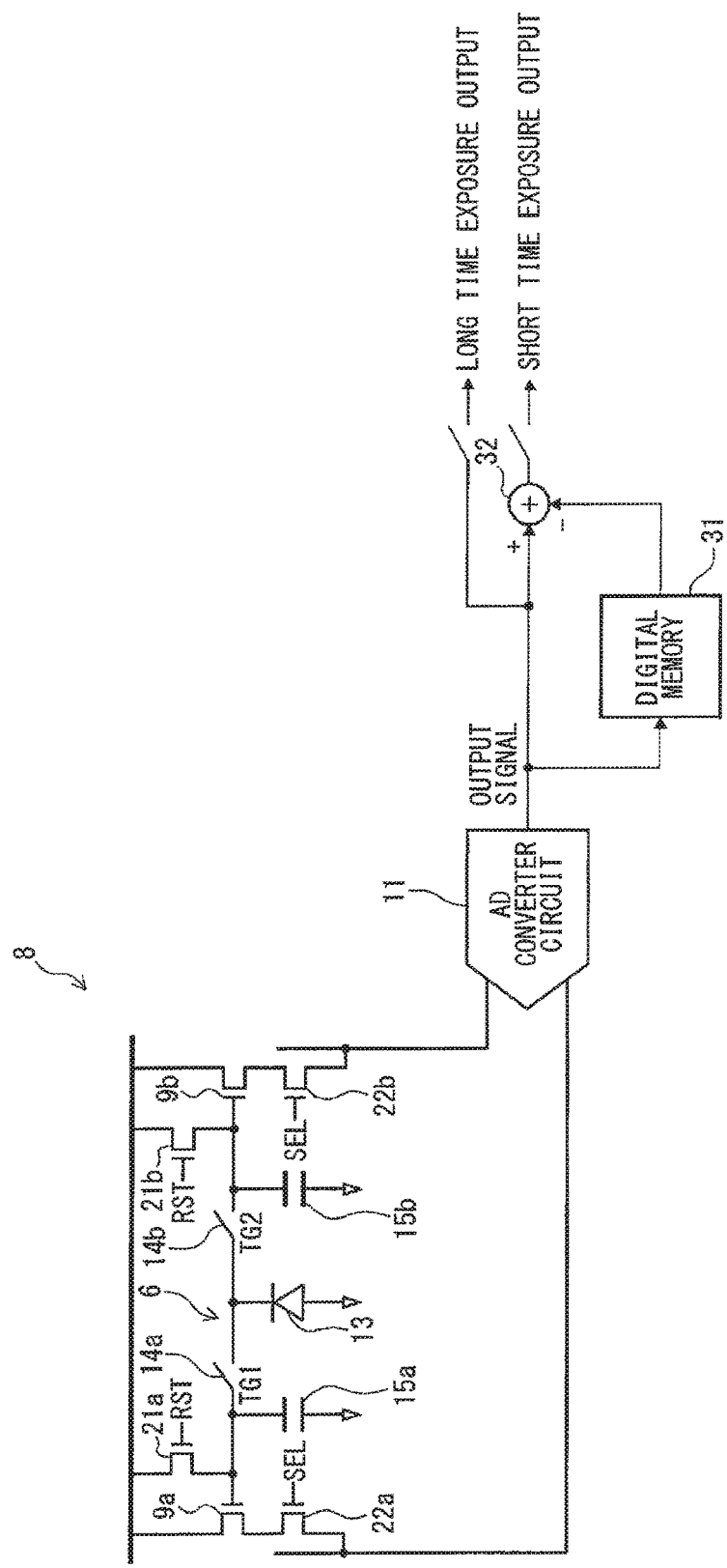
FIG. 17 illustrates a part of a distance measurement value acquiring circuit (No. 2).
Figure 18:
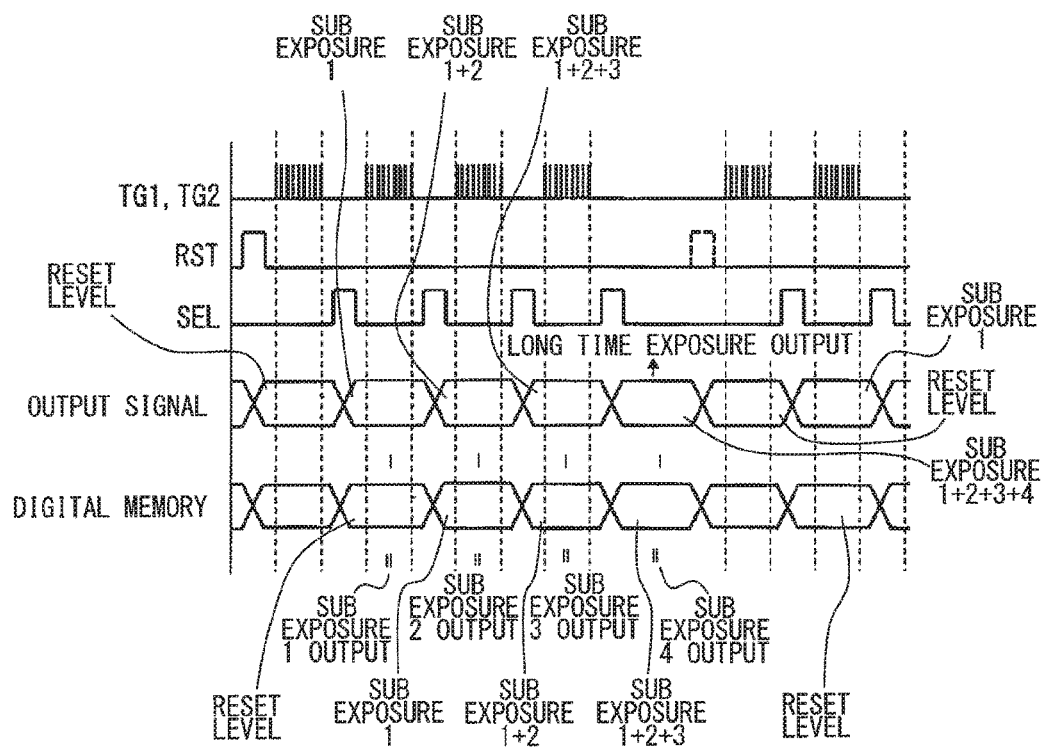
FIG. 18 is a timing chart illustrating output of the output signal (No. 2).

FIG. 17 illustrates a circuit diagram in which a part of the distance measurement value acquiring circuit 8, which is a latter part of the light receiving element 6, is formed by a digital memory, and FIG. 18 illustrates a timing chart of the operation of the circuit. The AD converter circuit 11 reads out the amount of the electric charge from the light receiving element 6 by a differential and applies the AD conversion to the amount of the electric charge and outputs an output signal to a digital memory 31 and a difference calculation circuit 32. When the digital memory 31 receives the output signal from the AD converter circuit 11, the digital memory 31 holds an output value of the received output signal, and when the digital memory 31 receives the next output signal, the digital memory 31 outputs the output signal including the holding output value to the difference calculation circuit 32. The difference calculation circuit 32 calculates the difference by subtracting the output value of the output signal input from the digital memory 31 from the output value of the output signal input from the AD converter circuit 11 and outputs the difference. That is, the distance measurement value acquiring circuit 8 outputs the output signal, which is directly output from the AD converter circuit 11, as the distance measurement value of the long time exposure and outputs the output signal, which is output from the difference calculation circuit 32, as the distance measurement value of the short time exposure. In such a configuration in which the difference is calculated by the digital circuit, compared to the configuration in which the difference is calculated by the analog circuit, an influence of a quantization error becomes a problem, however an area of the circuit and an influence of a noise can be suppressed.

Next, control of the sub exposure and control of the long time exposure will be described.

Figure 19:
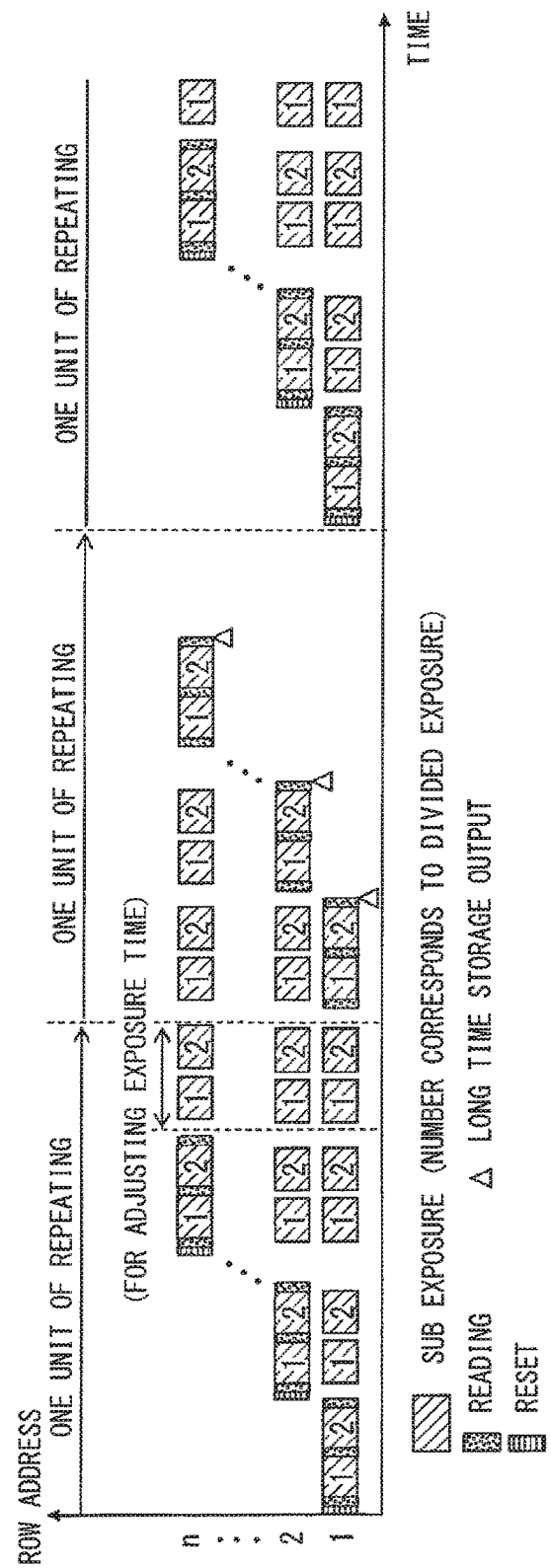
FIG. 19 is a timing chart in which a rolling reset and a rolling reading are performed (No. 1).

FIG. 19 illustrates a timing chart in which a rolling reset and a rolling reading are performed. In the timing chart in FIG. 19, since a time in which any row is not read (the time for adjusting an exposure time) is set, it is not necessary to set the time of the long time storage to be a multiple of the number of the rows of the reading. Since the electric charge obtained by the long time exposure is stored in the capacitor of each pixel, the analog differential signal processing circuit 23 and the analog memory 24 illustrated in FIG. 15 or the AD converter circuit 11 and the digital memory 31 illustrated in FIG. 17 may be arranged by column.

Figure 20:
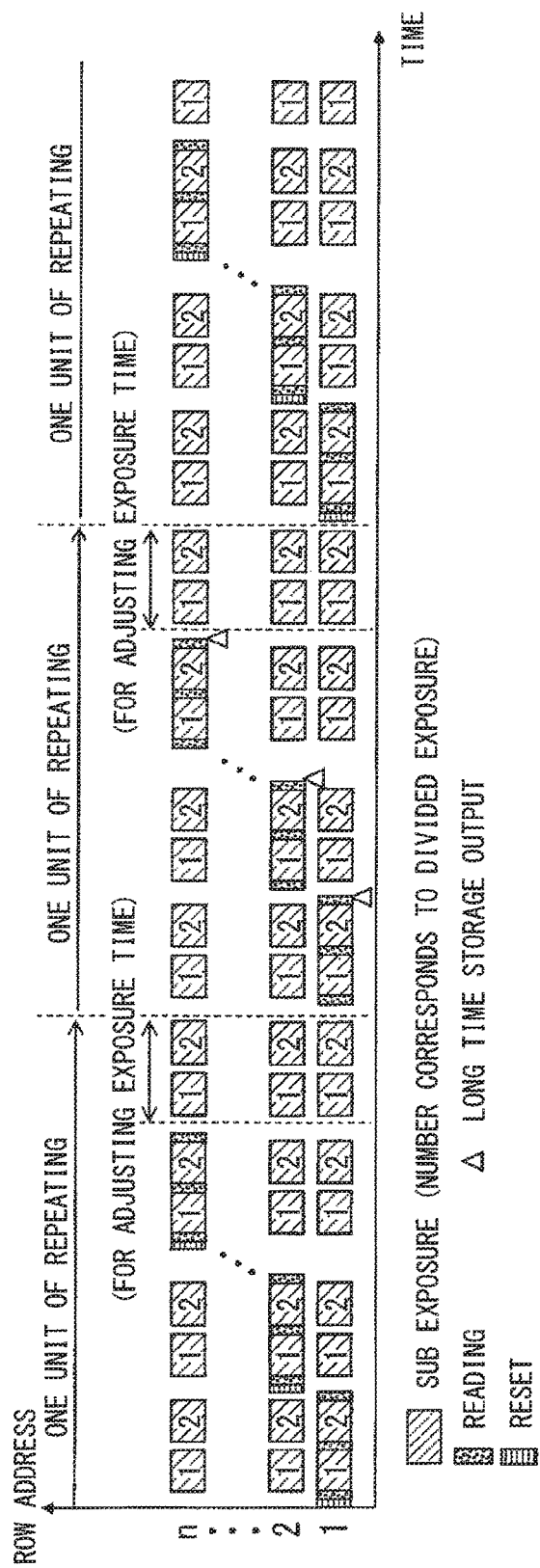
FIG. 20 is a timing chart in which a rolling reset and a rolling reading are performed (No. 2).

FIG. 20 illustrates another timing chart in which the rolling reset and the rolling reading are performed. In the timing chart in FIG. 19 described above, the sequence of the sub exposure is stopped before and after the exposure time of a rolling shutter, however in a case in which an influence that the electric charge flows around the pixel or the like is not generated, the exposure may be performed globally by the same driving waveform and only the reading may be achieved by the rolling reset.

Figure 21:
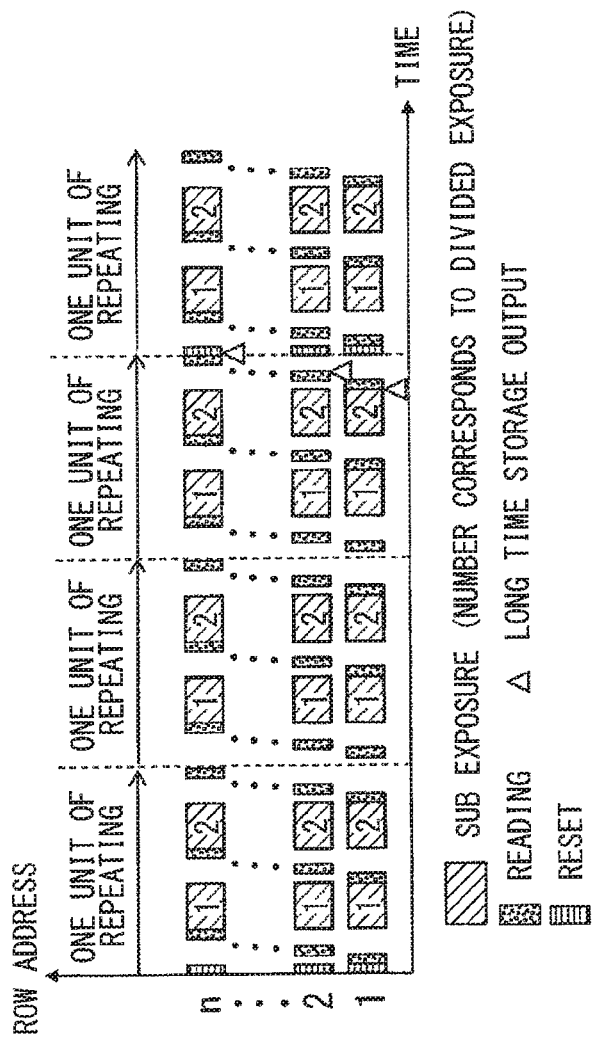
FIG. 21 is a timing chart in which a global reset and a rolling reading are performed (No. 1).

FIG. 21 illustrates a timing chart in which a global reset and a rolling reading are performed. In the global reset, since it is necessary to hold values of all of the pixels in the memory, a size of the circuit is increased, however a problem accompanied by unsecured simultaneity of the exposure in each row (so-called focal plane distortion) can be suppressed.

Figure 22:
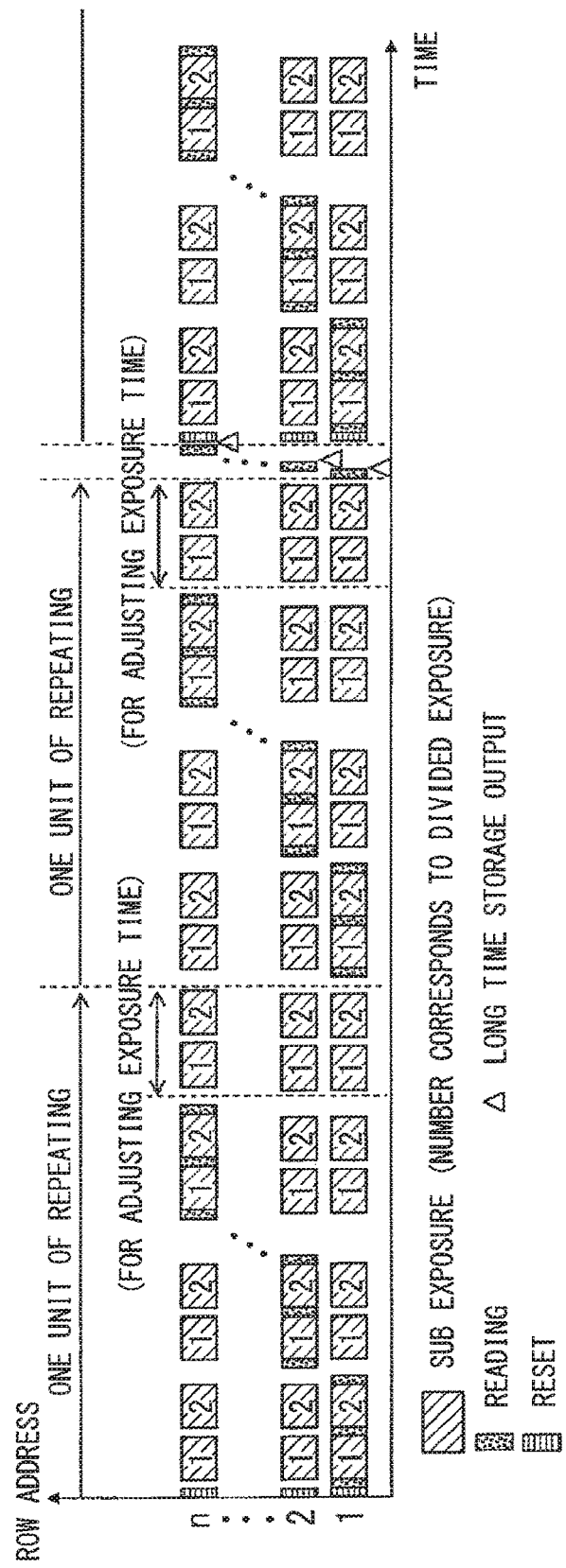
FIG. 22 is a timing chart in which a global reset and a rolling reading are performed (No. 2).

FIG. 22 illustrates another timing chart in which the global reset and the rolling reading are performed. By setting the long time storage to be a global shutter and setting the short time storage to be a rolling shutter, output with little focal plane distortion can be acquired at a side of the long time storage. Also in this case, the analog differential signal processing circuit 23 and the analog memory 24 illustrated in FIG. 15 or the AD converter circuit 11 and the digital memory 31 illustrated in FIG. 17 may be arranged by column.

Figure 23:
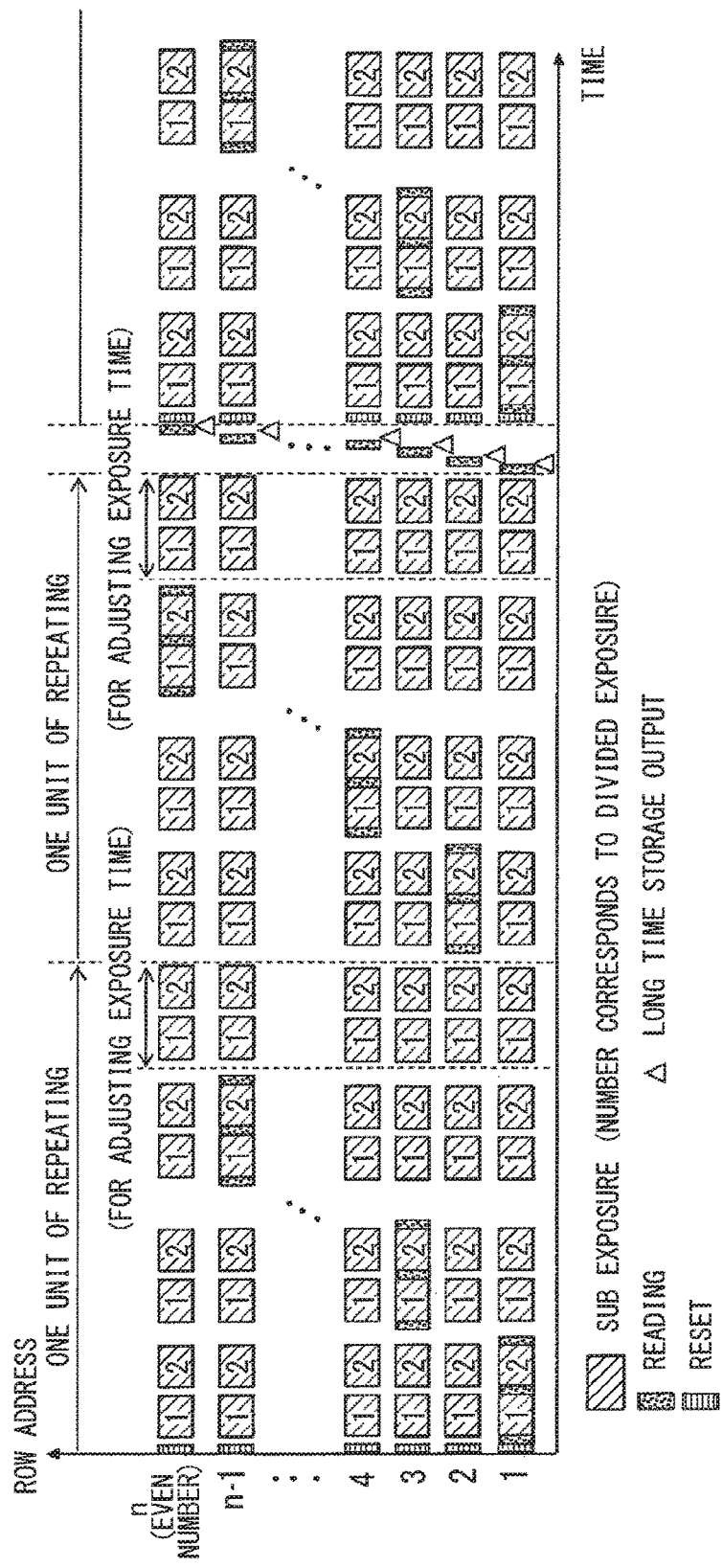
FIG. 23 is a timing chart in which a global reset and a rolling reading are performed (No. 3).

FIG. 23 illustrates further another timing chart in which the global reset and the rolling reading are performed. In a case in which the frame rate at a side of the sub exposure is regulated by a pixel reading time, by thinning out and reading a rolling shutter of the sub exposure, the frame rate can be increased. In a case in which a distance between the own device and the target is short or the target is formed by an object having a high reflectance, it is highly possible to be measured across a plurality of rows, and therefore such a configuration hardly becomes a problem.

Next, control which optimizes amplitude (read output value) of each of output pixels of the long time exposure will be described.

Figure 24:
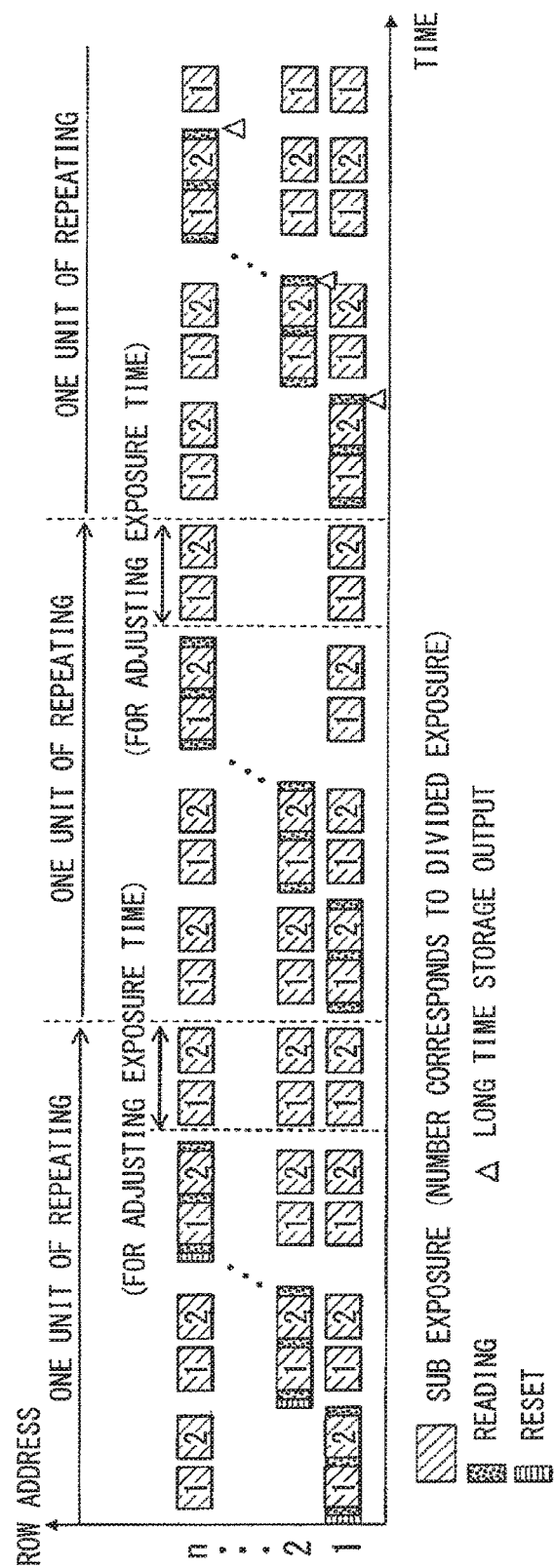
FIG. 24 is a timing chart in which control which optimizes amplitude of each of output pixels of long time storage is performed (No. 1)

FIG. 24 illustrates a timing chart to optimize the amplitude of each of the output pixels of the long time exposure. In an example in FIG. 24, relating to the pixels in rows other than a second row, since the amplitude is insufficient when the second round of reading is performed, further exposure is repeated. However relating to the pixels in the second row, since the amplitude is sufficient when the second round of the reading is performed, the exposure is stopped in the second round. Since a control line of the exposure is common in the rows, it is determined whether the amplitude is sufficient by using an average value, a maximum value, or a minimum value of a corresponding row.

Figure 25:
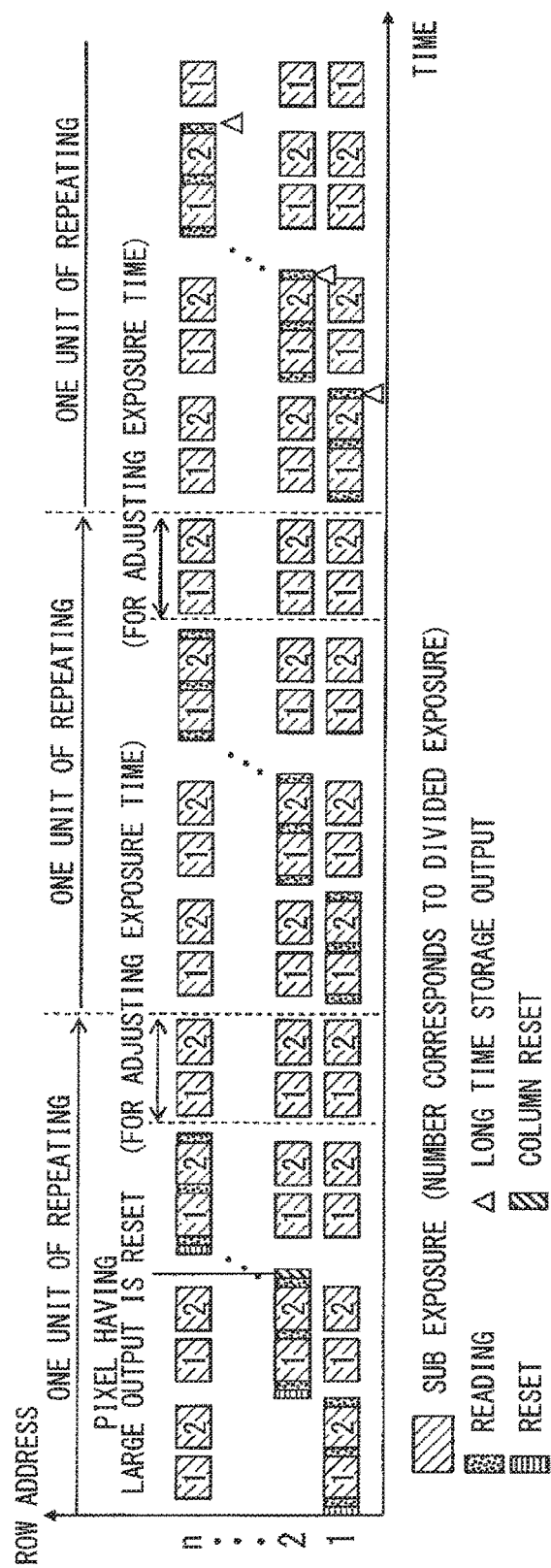
FIG. 25 is a timing chart in which control which optimizes the amplitude of each of the output pixels of the long time storage is performed (No. 2).

FIG. 25 illustrates another timing chart to optimize the amplitude of each of the output pixels of the long time exposure. By inserting a reset in each pixel having a high output value of the sub exposure, it is controlled such that the electric charge of the long time exposure is not saturated at the end. In an example in FIG. 25, the reset is inserted into the pixel of the second row.

Figure 26:
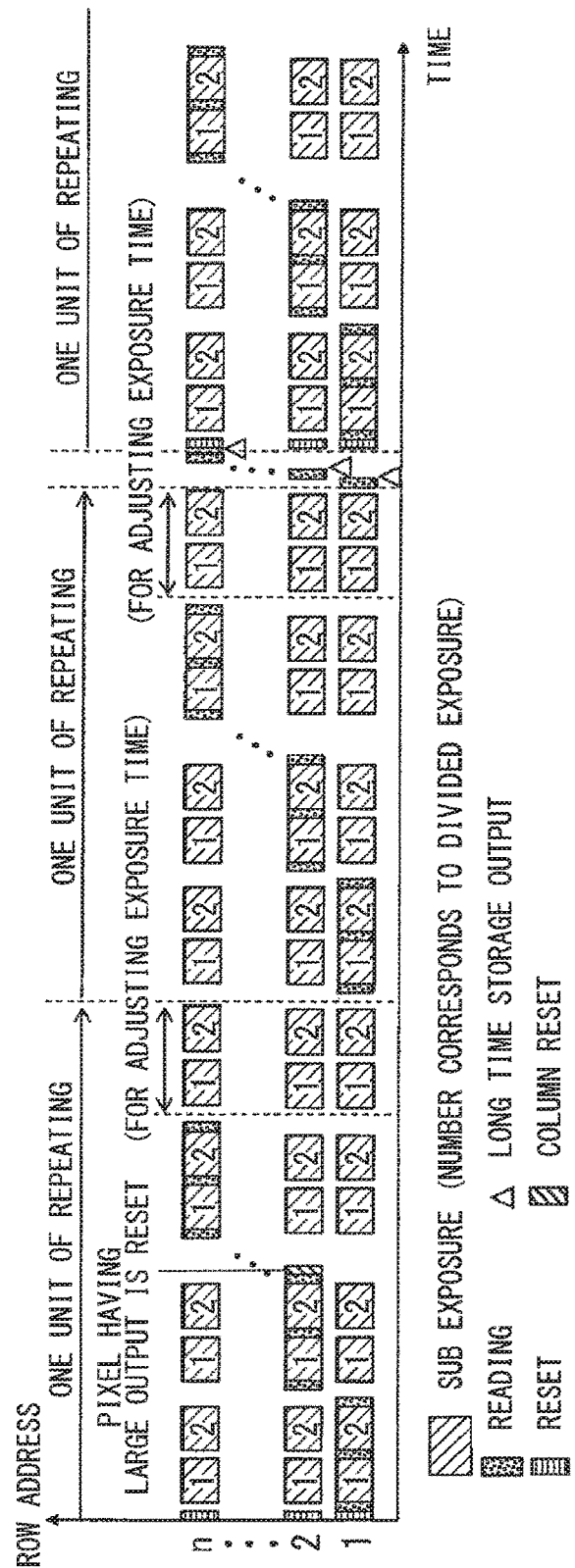
FIG. 26 is a timing chart in which control which optimizes the amplitude of each of the output pixels of the long time storage is performed (No. 3).

FIG. 26 illustrates another timing chart to optimize the amplitude of each of the output pixels of the long time exposure. FIG. 25 described above illustrates a case in which the rolling reset is adopted, however a reset may be inserted in each pixel having a high output value of the sub exposure in a configuration in which the global reset is adopted.

Figure 27:
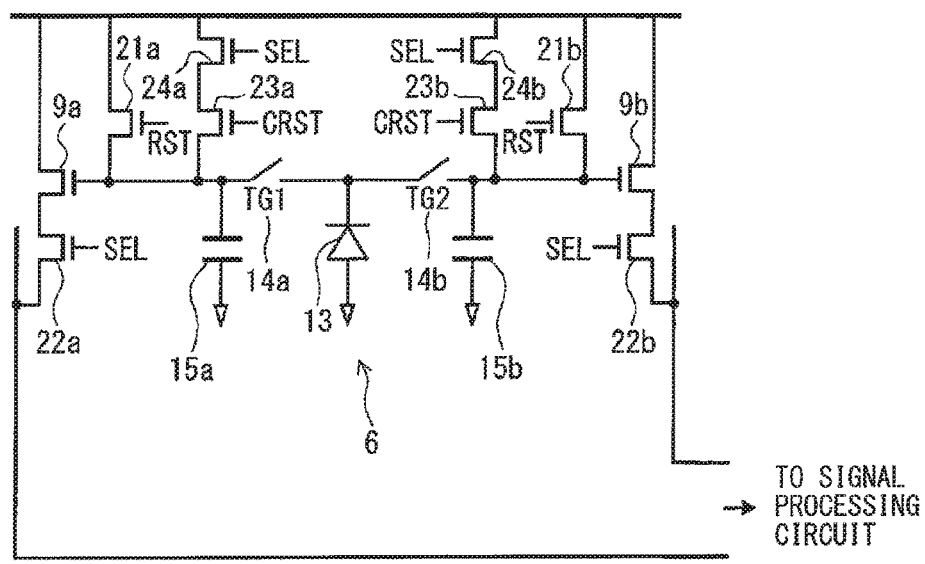
FIG. 27 illustrates a part of a distance measurement value acquiring circuit (No. 3).
Figure 28:
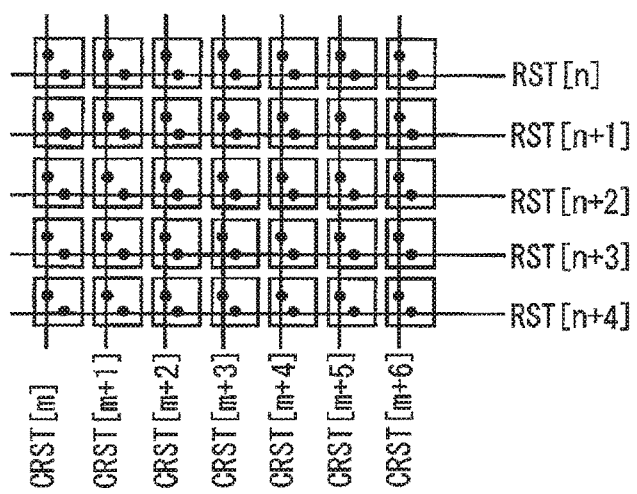
FIG. 28 illustrates a wiring (No. 1).

FIG. 27 illustrates a circuit diagram in which a reset is enabled in each pixel adaptively, and FIG. 28 illustrates the wiring of the circuit. In this case, in addition to the buffers 9a, 9b, the reset switching elements 21a, 21b, and the selector switching elements 22a, 22b, column reset switching elements 23a, 23b and selector switching elements 24a, 24b are connected to the light receiving element 6 in the distance measurement value acquiring circuit 8. In the sequences illustrated in FIG. 25 and FIG. 26, whether it is reset in each pixel can be selected while keeping the configuration in which the control line of the exposure control is set to be common in the rows. By setting both of an SEL line and a CRST line to be "H", only the pixel can be reset and therefore only the pixel with large amplitude in the reading row can be reset.

Figure 29:
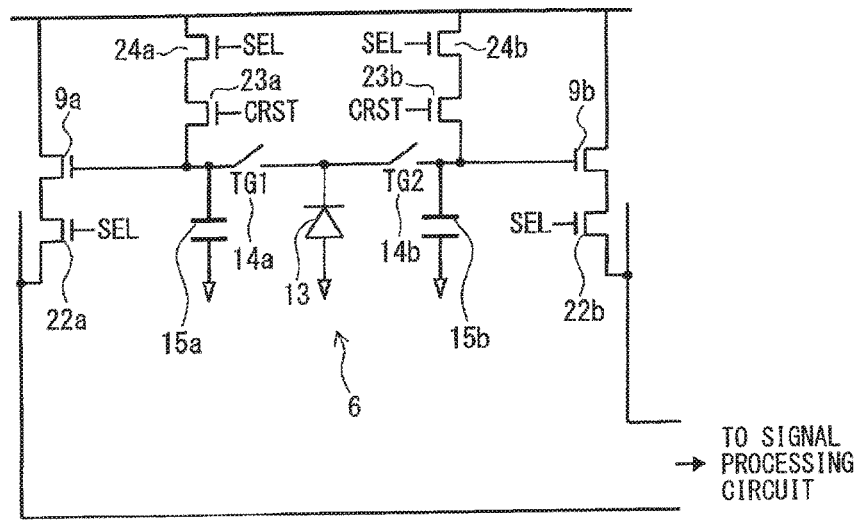
FIG. 29 illustrates a part of a distance measurement value acquiring circuit (No. 4).
Figure 30:
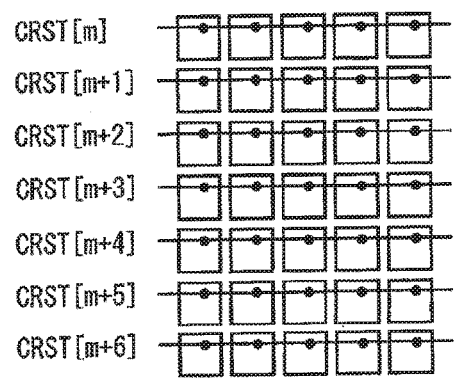
FIG. 30 illustrates a wiring (No. 2).

FIG. 29 illustrates another circuit diagram in which the reset is enabled in each pixel adaptively, and FIG. 30 illustrates the wiring of the circuit. In the configuration in FIG. 27, the reset in each row can be enabled by setting all of the CRST lines to be "H" at the same time, and therefore the RST line is redundant. That is, in FIG. 29, a configuration in which the RST line is omitted from the configuration in FIG. 27 is adopted.

As described above, according to the first embodiment, the following effects can be obtained.

In the time-of-flight distance measuring device 1, the base exposure period corresponding to the long time storage in the reference example is divided into the plurality of the sub exposure periods, and the electric charge stored during the sub exposure period is held without being reset in the period of one round of the sub exposure periods. By acquiring the distance measurement value of the short time exposure from the amount of the electric charge stored in the one round period and by acquiring the distance measurement value of the long time exposure by integrating the amount of the electric charge stored in a plurality of one round periods, both of the distance measurement value of the long time exposure and the distance measurement value of the short time exposure are acquired from one pixel (the same pixel). With this, the dynamic range can be expanded without being restricted by a receiving state of the reflected light, optical design of the received light, and an arrangement of the pixels. In particular, it is suitable to the on-vehicle device or the like in which at least one of the own device and the target is moved.

(Second Embodiment)

Next, a time-of-flight distance measuring device according to a second embodiment will be described.

Figure 54:
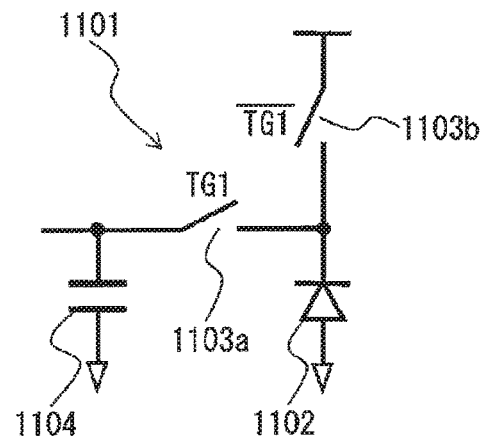
FIG. 54 illustrates a configuration of a light receiving element (a configuration of one capacitor) according to a comparative example.
Figure 55:
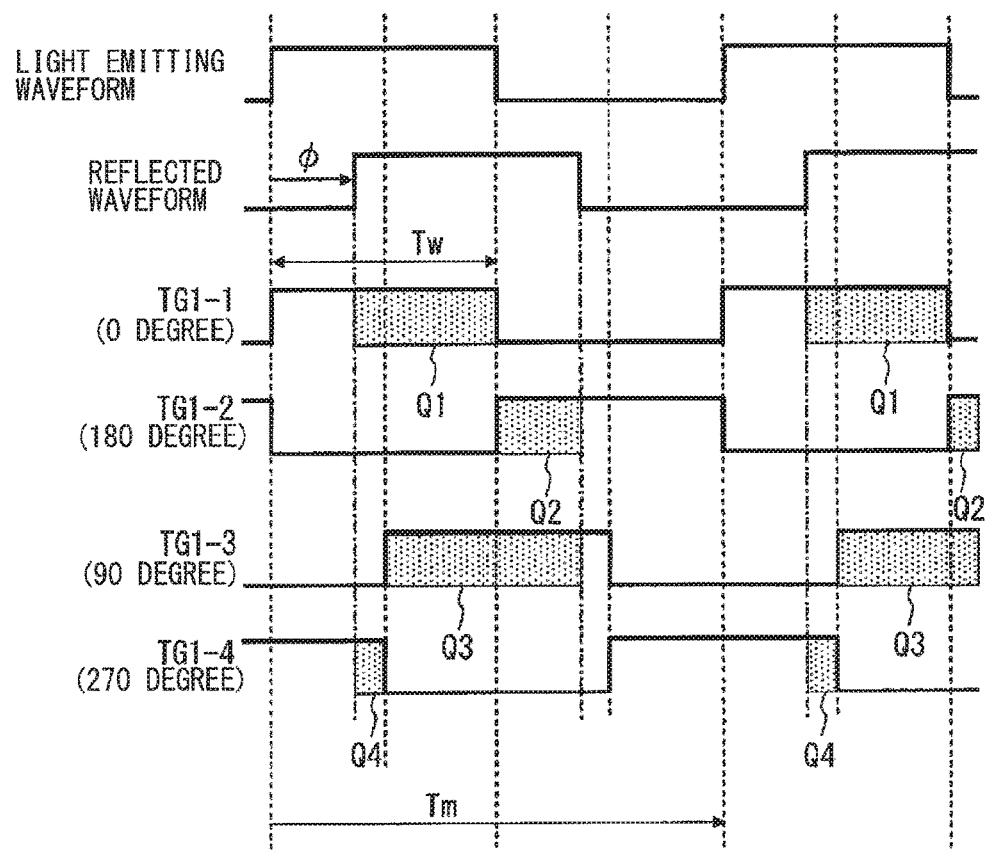
FIG. 55 illustrates a sequence of a configuration of single end output according to the comparative example.
Figure 56:
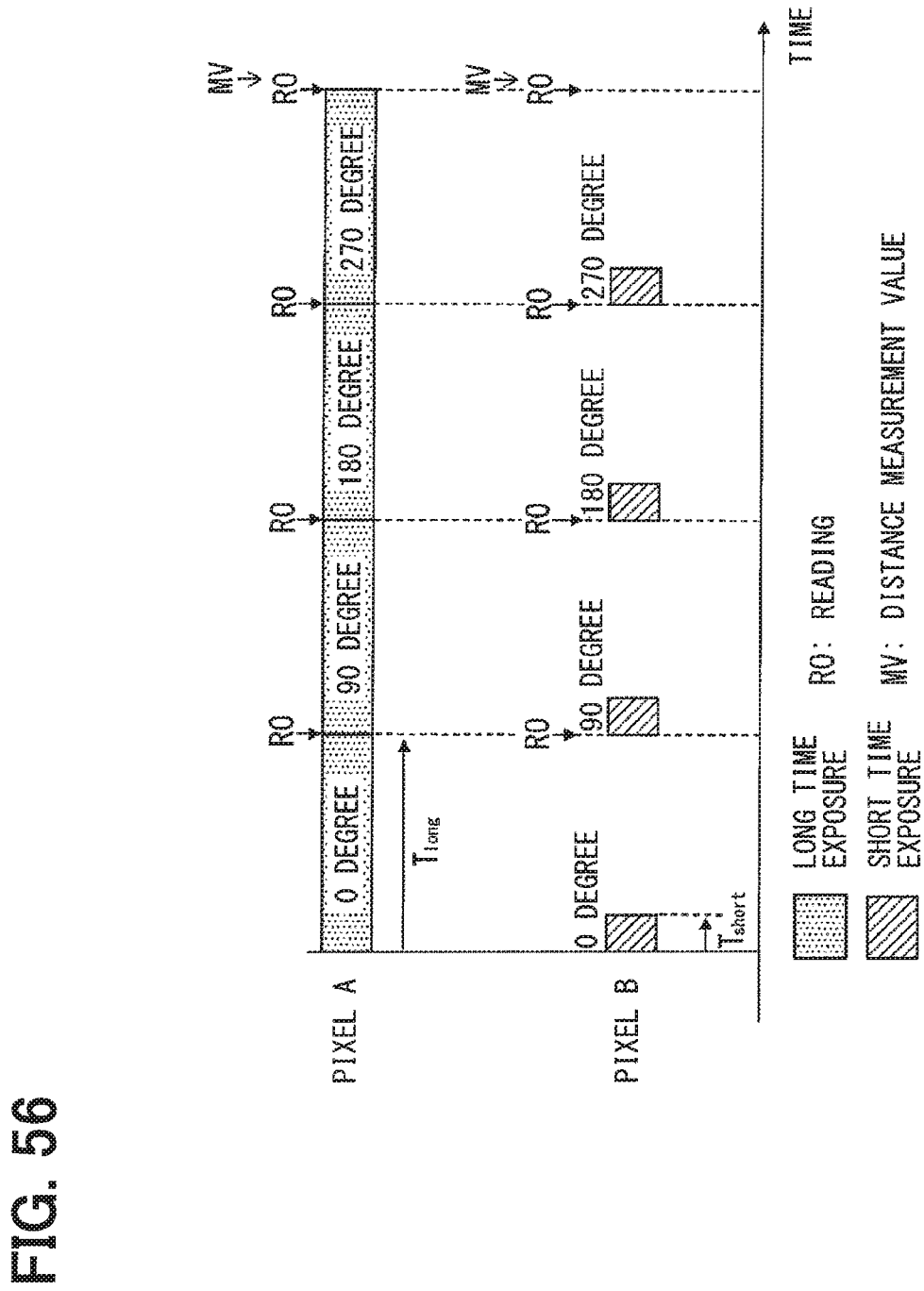
FIG. 56 is a timing chart in which multiple exposure is performed according to the comparative example.

At first, a case in which multiple exposure is performed will be described by using a comparative example illustrated in FIG. 54 to FIG. 56 for facilitating understanding of a technical meaning of the time-of-flight distance measuring device according to the second embodiment. As illustrated in FIG. 54 and FIG. 55, a light receiving element 1101 includes a PD (Photodiode) 1102, two modulation switches 1103a, 1103b, and one storage capacitor 1104, and a case in which four phases distance measurement is performed will be described as one example. In this case, as illustrated in FIG. 56, for example, a pixel group of a pixel A performs long time exposure by repeating thousand times of driving and a pixel group of a pixel B performs short time exposure by repeating hundred times of driving, and thereby a dynamic range can be expanded by 20 dB.

In the comparative example, the frame rate is increased compared to a configuration in which the multiple exposure is performed in series by distributing a plurality of the pixels within a plane into the pixel group which performs the long time exposure and the pixel group which performs the short time exposure. However, in the four phases distance measurement of the short time exposure, similar to the long time exposure, since a distance is calculated after respective values of 0 degree, 90 degrees, 180 degrees, and 270 degrees are read, the frame rate of the short time exposure is regulated by the time of the long time exposure. In this way, in the method according the comparative example, there is a limit to increasing the frame rate of the short time exposure.

By taking such a point into consideration, the time-of-flight distance measuring device according to the second embodiment capable of expanding the dynamic range appropriately and increasing the frame rate of the short time exposure appropriately will be described below in detail with reference to FIG. 34 to FIG. 45.

The second embodiment adopts a configuration of single end output. A time-of-flight distance measuring device 201 includes a signal source 202, a driving circuit 203 (driving unit), a light emitting element 204, a control circuit 205 (control unit), a light receiving element 206, and a distance measurement value acquiring circuit 207 (distance measurement value acquiring unit). The distance measurement value acquiring circuit 207 is provided with a buffer 208, an AD converter circuit 209, and a digital signal processing circuit 210.

The signal source 202 establishes synchronization between the light emitting element 204 and the light receiving element 206 by outputting a driving signal to the driving circuit 203 and the control circuit 205, and the signal source 202 controls exposure of the light receiving element 206 while synchronizing the light receiving element 206 with modulated light emitted from the light emitting element 204. The driving signal output from the signal source 202 may be formed by a rectangular pulse (normally, several to several tens of MHz) that drives the light emitting element 204 and the light receiving element 206, or alternatively may be formed by only a synchronous pulse. The light emitting element 204 is formed by an LD (Laser Diode) or an LED (Light Emitting Diode) that emits, for example, infrared light as the modulated light. The light receiving element 206 is formed by an image sensor using a process of, for example, a CMOS (Complementary Metal Oxide Semiconductor) or a CCD (Charge Coupled Device).

Figure 35:
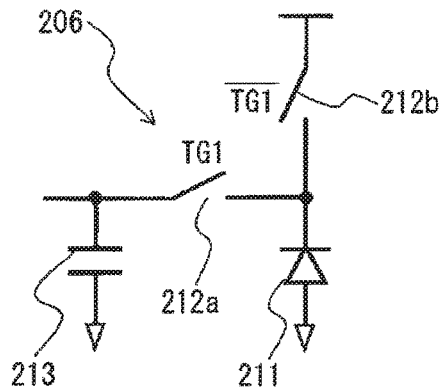
FIG. 35 illustrates a configuration of a light receiving element (a configuration of one capacitor).

As illustrated in FIG. 35, the light receiving element 206 includes a PD (Photodiode) 211, two modulation switches 212a, 212b, and one storage capacitor 213. Each of the two modulation switches 212a, 212b is formed by, for example, a MOS type device such as a MOS transistor or a transfer gate, a CCD structural device or the like. The storage capacitor 213 is formed by, for example, a capacitance element such as a MOS, a CCD, and a MIM (Metal Insulator Metal), a wiring, a parasitic capacitor of a PN junction, or the like. The light receiving element 206 drives the modulation switches 212a, 212b by using a control signal (gate signal) TG1 and stores an electric charge generated by the received incident light in the storage capacitor 213 and outputs a signal indicative of an amount of the electric charge into the distance measurement value acquiring circuit 207. Since the control signal TG1 is formed to be synchronized with the modulated light, the amount of the electric charge stored in the storage capacitor 213 is changed in accordance with a distance between the own device and the target.

The buffer 208 is achieved by, for example, a source follower circuit as its simple configuration. The AD converter circuit 209 converts the signal input from the buffer 208, which is an analog signal, into a digital signal and outputs the digital signal into the digital signal processing circuit 210. The digital signal processing circuit 210 processes the digital signal input from the AD converter circuit 209 and calculates the distance between the own device and the target from the amount of the electric charge stored in the storage capacitor 213 and acquires the distance measurement value (measures the distance).

Figure 36:
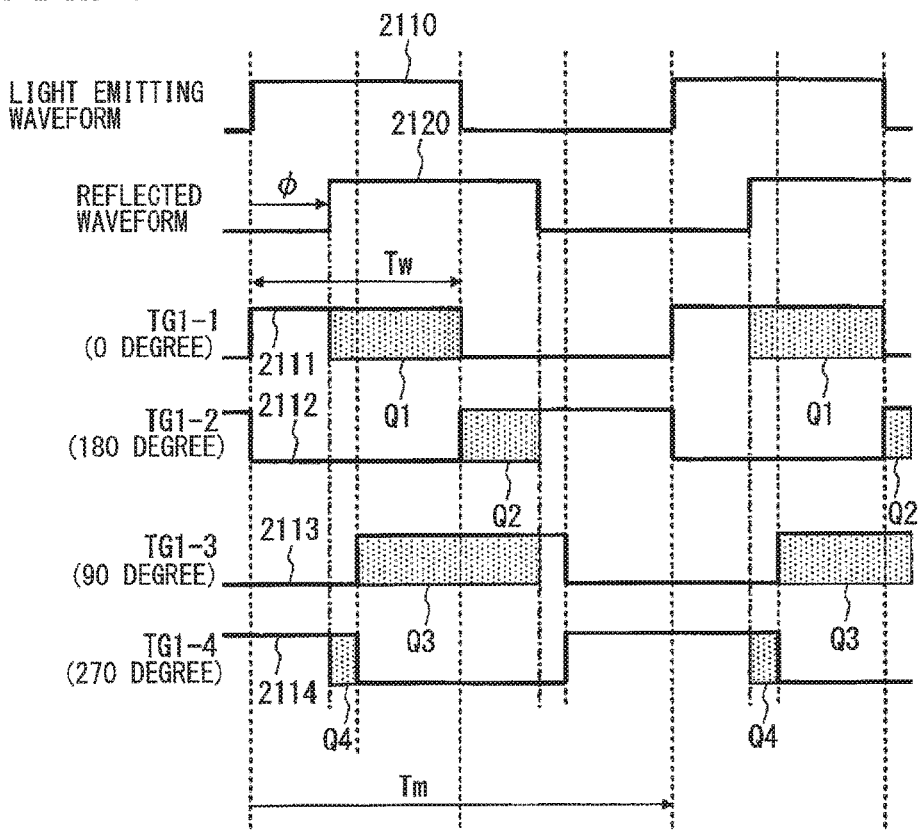
FIG. 36 illustrates a sequence of the configuration of the single end output.

FIG. 36 illustrates a sequence (modulation cycle: Tm, exposure period: Tw) in which four phases distance measurement is performed as a duty cycle of a light emitting waveform is set to be 50% (the light receiving element 206 is driven in four phases). A waveform of the modulated light emitted from the light emitting element 204 (light emitting waveform 2110) is modulated by a rectangular wave synchronized with the control signal TG1. In FIG. 36, a case in which the waveform is modulated by the rectangular wave is illustrated as an example, however the waveform may be modulated by a sine wave, a triangular wave, or a waveform of a pseudorandom sequence or the like. A waveform of the reflected light of the modulated light reflected by the target (reflected waveform 2120) has a time difference against the light emitting waveform 2110 and therefore the waveform of the reflected light is delay against the light emitting waveform 2110 by a phase difference θ. On the other hand, the control signal TG1 is driven by rectangular waves having phases different from each other by 90 degrees. The digital signal processing circuit 210 repeats a sequence which is driven by control signals TG1-1, TG1-2 (driving waveforms 2111, 2112) several ten times to several hundred thousand times and then acquires information of generated electric charges Q1, Q2 (voltage value applied to electric charge voltage conversion). After that the digital signal processing circuit 210 repeats a sequence which is driven by control signals TG1-3, TG1-4 (driving waveforms 2113, 2114) several ten times to several hundred thousand times similarly and then acquires information of generated electric charges Q3, Q4. The digital signal processing circuit 210 calculates the phase difference θ from the acquired Q1 to Q4 on the basis of Expression (1) described in the first embodiment by using the discrete Fourier transform (DFT).

In a case in which such a phase type time-of-flight distance measuring device 201 is used on a vehicle or the like, expansion of the dynamic range is required and improvement of the frame rate of the short time exposure is required. Hereinafter, a method for expanding the dynamic range and increasing the frame rate of the short time exposure according to the present disclosure will be described.

Figure 37:
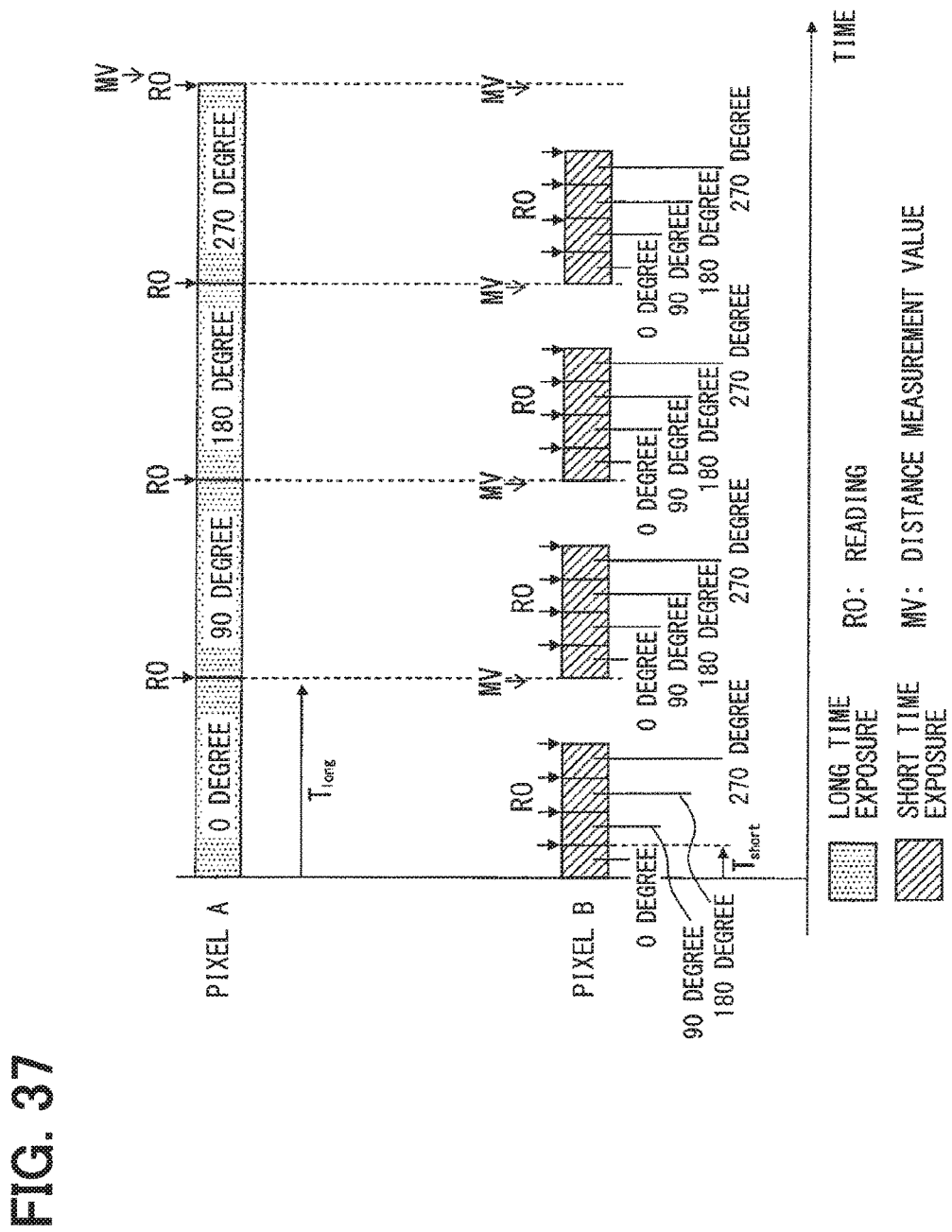
FIG. 37 is a timing chart in which multiple exposure is performed in the configuration of the single end output (No. 1).

FIG. 37 illustrates a timing chart of multiple exposure in the configuration of the single end output according to the present disclosure. When compared to the timing chart of the multiple exposure in the comparative example illustrated in FIG. 56 described above, in the multiple exposure in the present disclosure, the control circuit 205 groups a plurality of the pixels within a plane into a pixel group of a pixel A and a pixel group of a pixel B, and this is the same feature. However, in the multiple exposure in the present disclosure, the control circuit 205 performs a plurality of times of the short time exposure by performing storing and reading of the electric charge by not a single phase but a plurality of phases in the pixel group of the pixel B in a period in which the long time exposure is performed in the pixel group of the pixel A. As a result, relating to the pixel group of the pixel B, when compared in the same period, the number of acquiring the distance measurement value is increased compared to the multiple exposure in the comparative example, and therefore the distance measurement value can be renewed frequently and the frame rate can be increased. In an example in FIG. 37, in the period in which the pixel group of the pixel A performs one time of the long time exposure, the pixel group of the pixel B performs four times of the short time exposure, and thereby the quadruple of the frame rate can be achieved compared to a case of being driven by the timing chart in FIG. 56. An effective value which can be acquired by such a short time exposure (sufficient signal amplitude) is caused by the target close to the own device or by the reflected light reflected by the target having a high reflectance, and therefore the frame rate against the target close to the own device or the target having a high reflectance can be increased. That is, especially, it is suitable to an environment of an on-vehicle device or the like in which frequent calculation of the distance (increase of the frame rate) is required in order to avoid collision against the target (a person, a vehicle, a wall, or the like).

Figure 38:
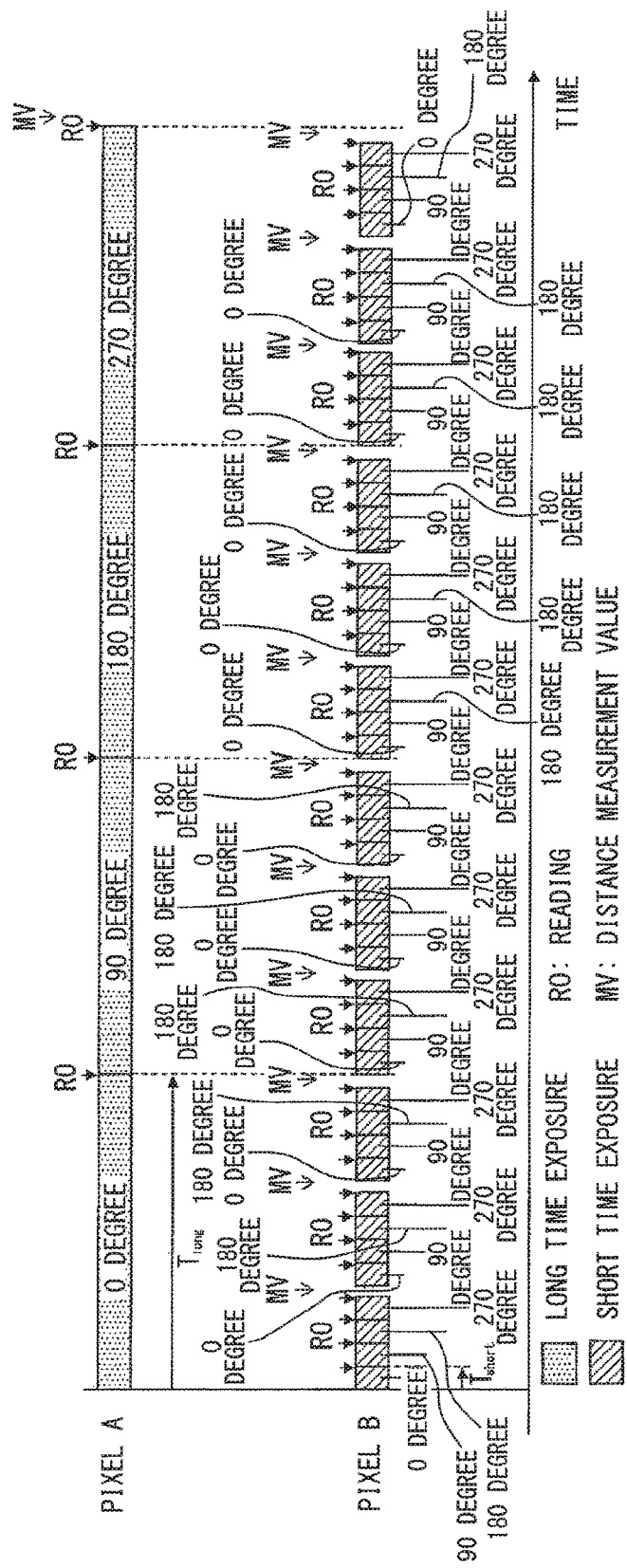
FIG. 38 is a timing chart in which multiple exposure is performed in the configuration of the single end output (No. 2).

FIG. 38 illustrates a timing chart of another multiple exposure in the configuration of the single end output. In FIG. 37 described above, a ratio of the frame rate of the long time exposure and the short time exposure is "4", however the ratio of the frame rates is not limited to "4". That is, the frame rate can be further increased by increasing the number of the cycles of the short time exposure against the long time exposure (repeating number). In an example in FIG. 38, it can be achieved that the frame rate is twelve times as large as that in a case of being driven by the timing chart in FIG.

56 and the frame rate is three times as large as that in a case of being driven by the timing chart in FIG. 37. Contrarily, from a viewpoint of the signal processing in the latter part, by reducing (thinning) the number of the cycles of the short time exposure against the long time exposure, the frame rate can be decreased.

Figure 39:
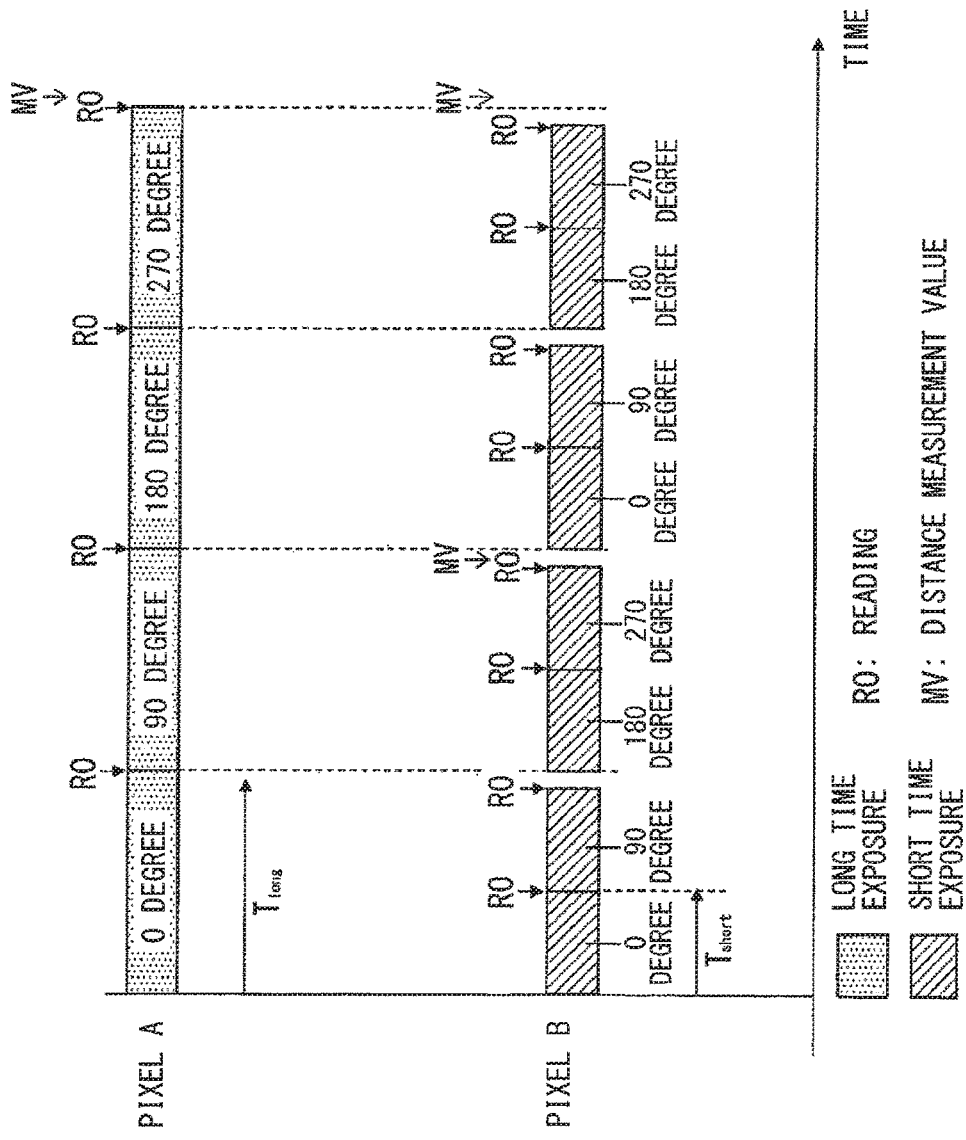
FIG. 39 is a timing chart in which multiple exposure is performed in the configuration of the single end output (No. 3).

FIG. 39 illustrates a timing chart of further another multiple exposure in the configuration of the single end output. In FIG. 37 and FIG. 38 described above, the distance measurement value is acquired more than one time in the short time exposure during the period in each phase of the long time exposure, however the distance measurement value may be acquired one time in the short time exposure during a period across a plurality of the phases of the long time exposure. In an example in FIG. 39, it can be achieved that the frame rate is twice as large as that in a case of being driven by the timing chart in FIG. 56.

Figure 40:
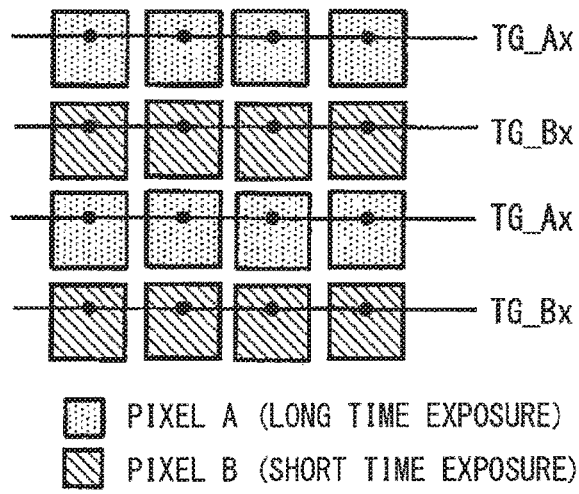
FIG. 40 illustrates an arrangement of pixels (No. 1).
Figure 41:
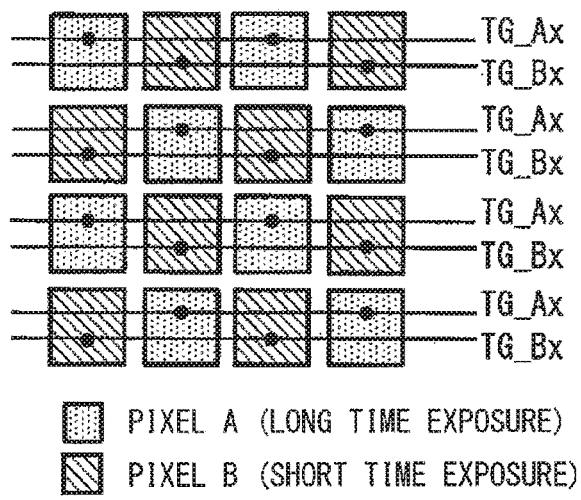
FIG. 41 illustrates an arrangement of the pixels (No. 2).

FIG. 40 and FIG. 41 illustrate arrangements in which a plurality of the pixels within a plane is grouped into two pixel groups. In FIG. 40, a pixel group A of the long time exposure and a pixel group B of the short time exposure are grouped by row. In the configuration in FIG. 40, a wiring of the control line which drives the modulation switches 12a, 12b is commonly used, and therefore the frame rate of the short time exposure can be increased without adding a large modification to an existing configuration. On the other hand, in FIG. 41, the pixel group A of the long time exposure and the pixel group B of the short time exposure are grouped to form a checkered pattern (check). In the configuration in FIG. 41, it is necessary to increase wirings of the control line, however in a case in which an image is formed by only the pixel group which performs the short time exposure, a space resolution can be increased.

Figure 42:
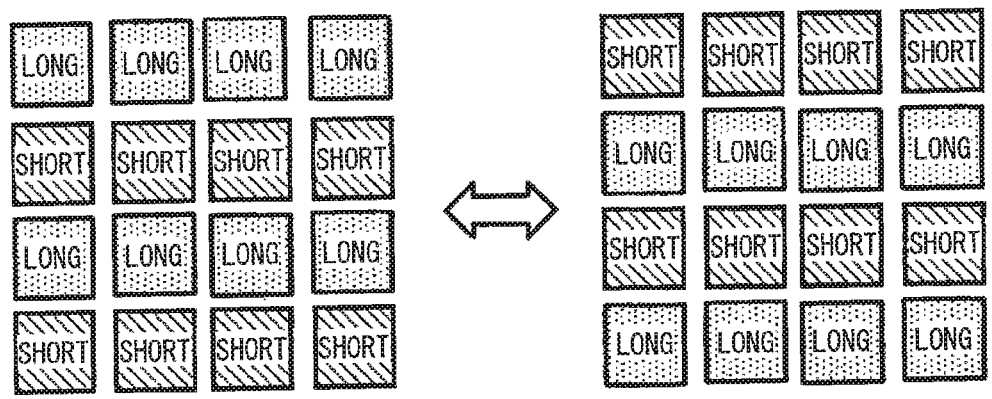
FIG. 42 illustrates a mode in which exposure time is switched by each pixel.

FIG. 42 illustrates a mode in which a pixel group of the long time exposure and a pixel group of the short time exposure are switched by time. In some cases, the reflected light reflected by the target far from the own device or the target having a low reflectance might be received by only one pixel. Thus, if the pixel group of the long time exposure and the pixel group of the short time exposure are fixed, the target whose distance measurement value cannot be acquired might exist. In this regard, by switching the pixel group of the long time exposure and the pixel group of the short time exposure by time (for example, unit of the frame), the problem described above can be avoided. FIG. 42 illustrates the mode in which a pixel group of the long time exposure and a pixel group of the short time exposure are switched in a configuration in which the pixel group of the long time exposure and the pixel group of the short time exposure are grouped by row as illustrated in FIG. 40. However the pixel group of the long time exposure and the pixel group of the short time exposure can be similarly switched in a configuration in which the pixel group of the long time exposure and the pixel group of the short time exposure are grouped to form a checkered pattern as illustrated in FIG. 41.

Figure 43:
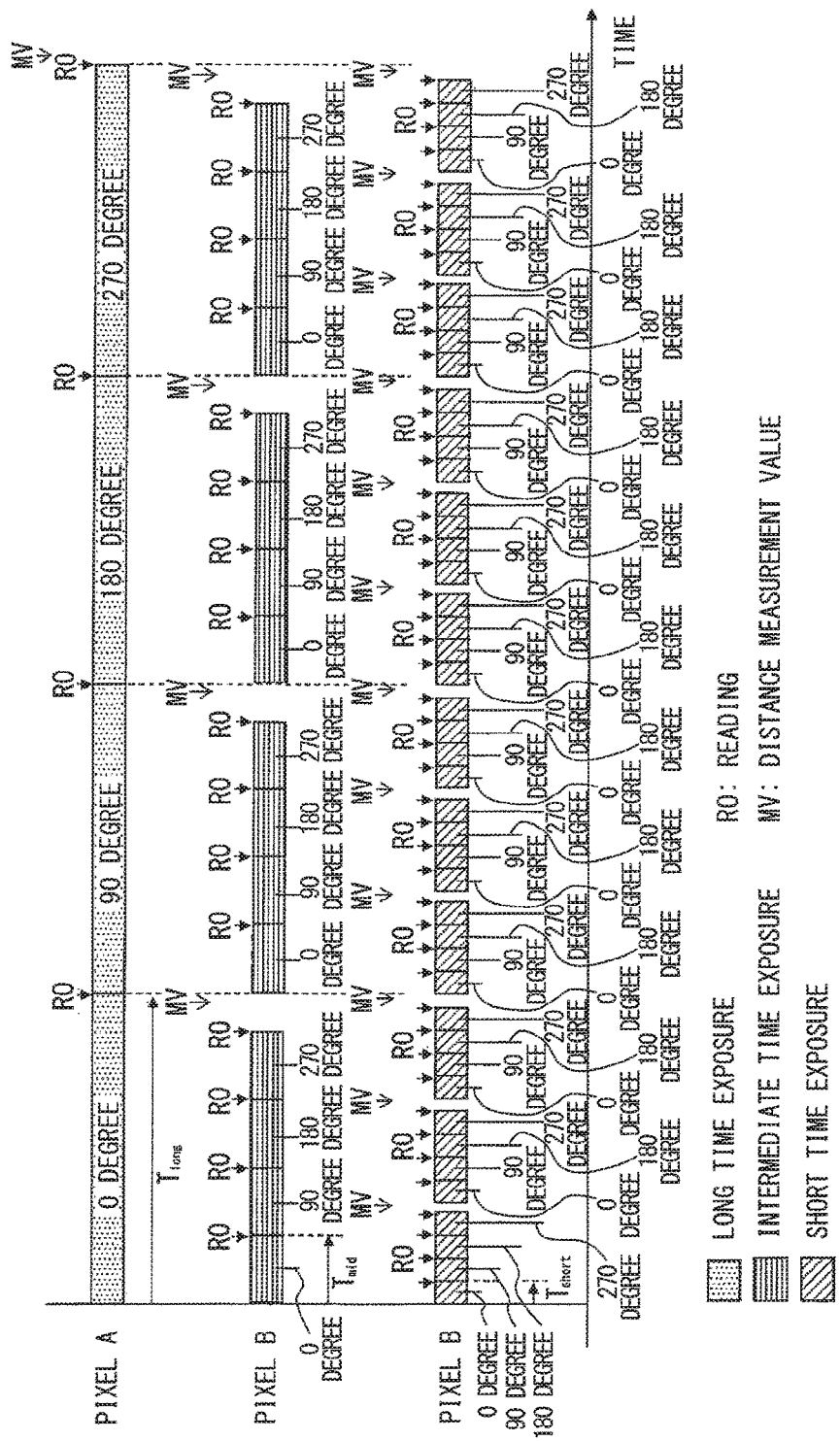
FIG. 43 is a timing chart in which multiple exposure is performed in the configuration of the single end output (No. 4).

FIG. 43 illustrates a timing chart of further another multiple exposure in the configuration of the single end output. In FIG. 37 to FIG. 39 described above, the pixels within the plane are grouped into the two pixel groups, however the pixels within the plane may be grouped into three pixel groups. In an example in FIG. 43, in a pixel group of a pixel B which performs intermediate time exposure, it can be achieved that the frame rate is four times as large as that of a pixel group of a pixel A which performs the long time exposure, and in a pixel group of a pixel C which performs the short time exposure, it can be achieved that the frame rate is twelve times as large as that of the pixel group of the pixel A which performs the long time exposure.

Figure 44:
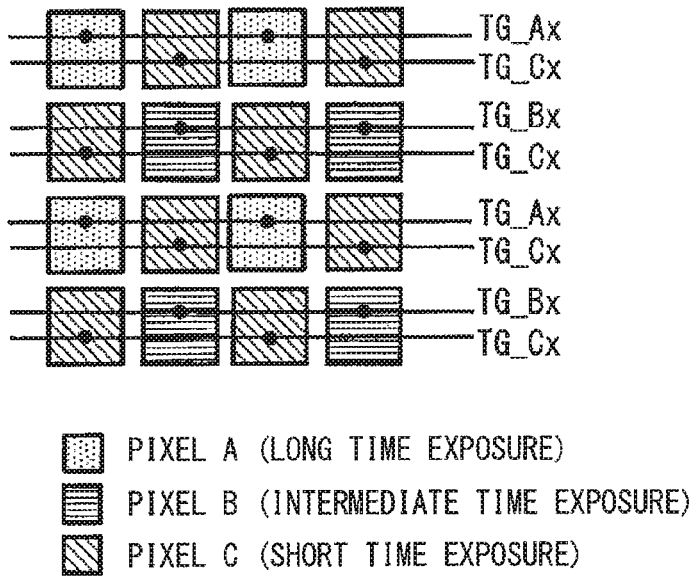
FIG. 44 illustrates an arrangement of the pixels (No. 3).
Figure 45:
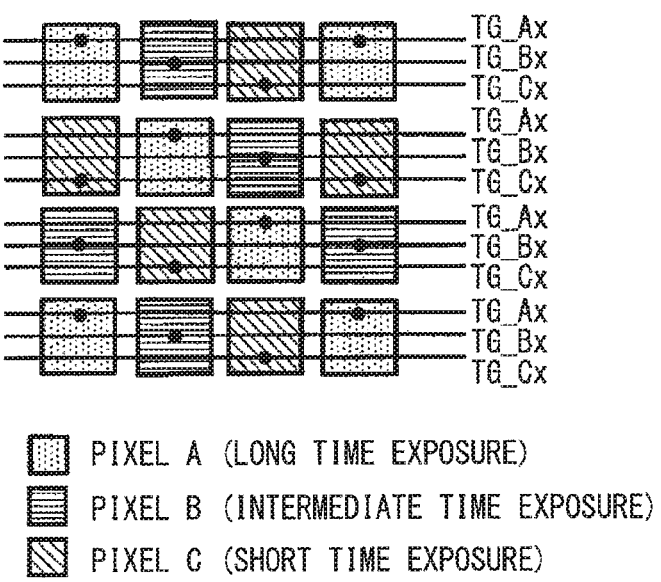
FIG. 45 illustrates an arrangement of the pixels (No. 4).
Figure 46:
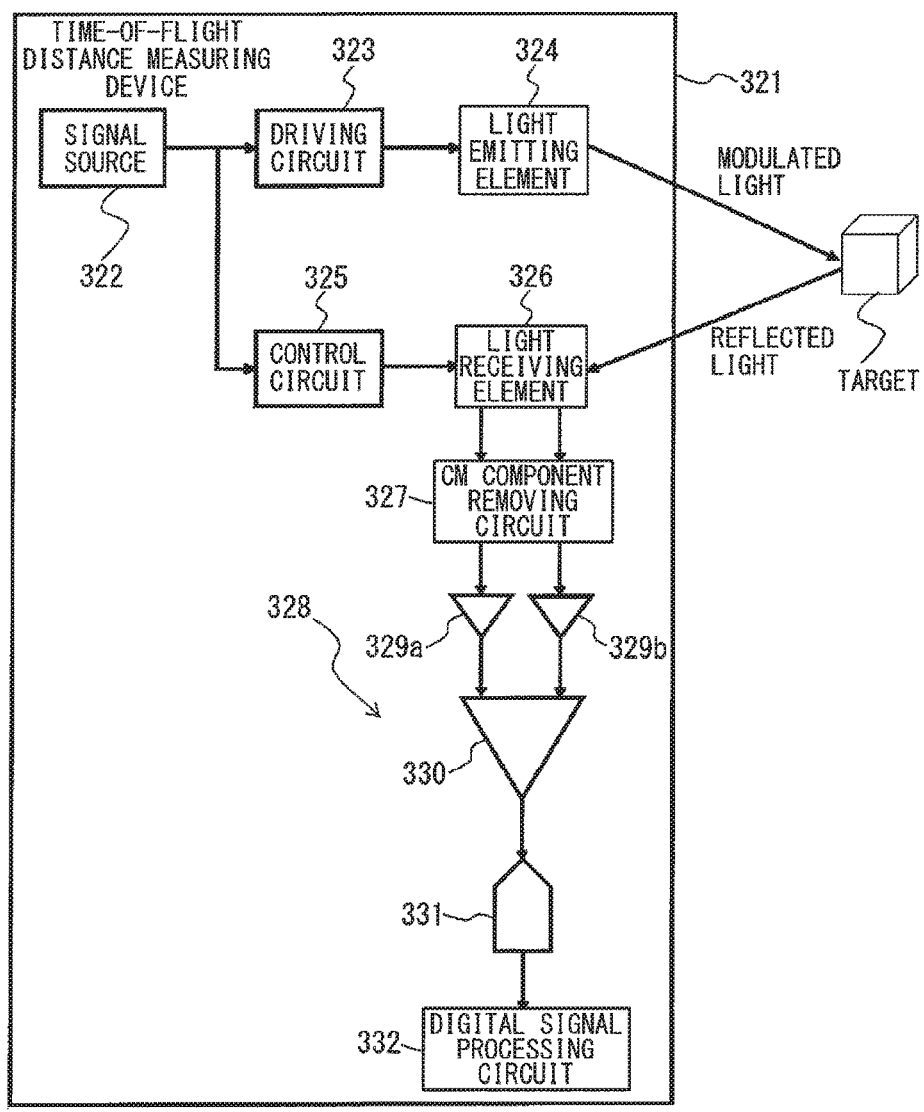
FIG. 46 is a functional block diagram illustrating a configuration of differential output according to a third embodiment of the present disclosure.

FIG. 44 and FIG. 45 illustrate arrangements in which a plurality of the pixels within a plane is grouped into three pixel groups (one pixel group, first another pixel group, and second another pixel group). In FIG. 44, pixels C are arranged in all rows and each of the pixel A and the pixel B is grouped to be arranged in every other row. In the configuration in FIG. 44, the number of the control lines necessary for one row is two in every row, this configuration facilitates common use, and in a case in which an image is formed by only the pixel group of the pixel C, a space resolution can be increased. The pixels A may be arranged in all rows and at the same time, each of the pixel B and the pixel C may be grouped to be arranged in every other row. The pixels B may be arranged in all rows and at the same time, each of the pixel A and the pixel C may be grouped to be arranged in every other row. On the other hand, in FIG. 45, each of the pixels A, the pixels B and the pixels C is grouped to be arranged in every row. In the configuration in FIG. 45, the number of the control lines necessary for one row is three in every row, and therefore the common use becomes difficult, however also in a configuration in which an image is formed by the pixel group of either of the pixel A, the pixel B or the pixel C, the space resolution can be increased. In this way, also in a case in which a plurality of the pixels within a plane is grouped into three pixel groups, the pixel groups may be switched by time.

As describe above, according to the second embodiment, the following effects can be obtained. In the time-of-flight distance measuring device 201, by distributing a plurality of the pixels within a plane into the pixel group which performs the long time exposure and the pixel group which performs the short time exposure, the dynamic range can be expanded. The light receiving element corresponding to the pixel group for the short time exposure acquires the measurement distance value a plurality of times in a plurality of times of the short time exposure in a period in which the light receiving element corresponding to the pixel group for the long time exposure acquires the measurement distance value one time in one time of the long time exposure, and thereby the frame rate in the short time exposure can be increased. With this, the frame rate of the short time exposure can be increased appropriately while expanding the dynamic range appropriately. In particular, it is suitable to the on-vehicle device or the like in which at least one of the own device and the target is moved.

(Third Embodiment)

Next a third embodiment of the present disclosure will be described with reference to FIG. 46 to FIG. 53. The same part as the second embodiment described above is omitted to be described, and a different part will be described. The second embodiment has the configuration of the single end output, however the third embodiment has a configuration of differential output. A time-of-flight distance measuring device 321 includes a signal source 322, a driving circuit 323 (driving unit), a light emitting element 324, a control circuit 325 (control unit), a light receiving element 326, a CM (Common Mode) component removing circuit 327, and a distance measurement value acquiring circuit 328 (distance measurement value acquiring unit). The distance measurement value acquiring circuit 328 includes buffers 329a, 329b, a difference detection circuit 330, an AD converter circuit 331, and a digital signal processing circuit 332.

Figure 47:
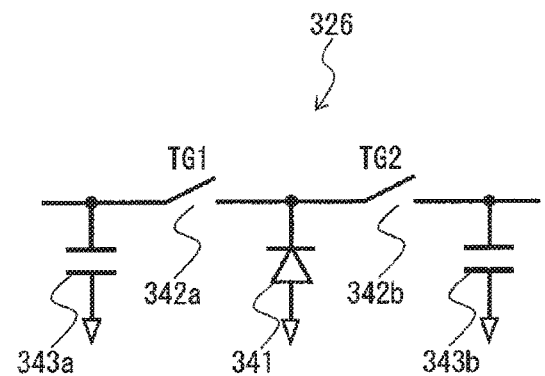
FIG. 47 illustrates a configuration of a light receiving element (a configuration of two capacitors).

The signal source 322, the driving circuit 323, the light emitting element 324, and the control circuit 325 are similar to the signal source 202, the driving circuit 203, the light emitting element 204, and the control circuit 205 described in the second embodiment respectively. As illustrated in FIG. 47, the light receiving element 326 includes 3PD41, two modulation switches 342a, 342b, and two storage capacitors 343a, 343b. The light receiving element 326 drives the modulation switches 342a, 342b by using control signals TG1, TG2 and distributes electric charge caused by the received incident light into the storage capacitors 343a, 343b and stores the electric charge and outputs a signal indicative of an amount of the electric charge into the CM component removing circuit 327. Since each of the control signals TG1, TG2 is formed to be synchronized with the modulated light, the amount of the electric charge distributed and stored into the storage capacitors 343a, 343b is changed depending on a distance between the own device and the target. In FIG. 47, the two storage capacitors 343a, 343b are illustrated as an example, however three or more storage capacitors may be arranged.

The CM component removing circuit 327 is formed to avoid the saturation of the pixels due to the electric charge caused by the background light in a case in which background light which cannot be ignored against the emitting modulated light exists. As a method for removing a CM component, various techniques are disclosed in prior art literatures. For example, the techniques are disclosed in U.S. Pat. No. 6,919,549 B2, DE 102005056774 A1, EP 1622200 A1, and the like. The difference detection circuit 330 detects a difference of the signal input from the CM component removing circuit 327 via the buffers 329a, 329b and outputs a signal depending on the detected difference into the AD converter circuit 331. The difference detection circuit 330 is achieved by, for example, a differential amplifier.

The AD converter circuit 331 converts the signal input from the difference detection circuit 330, which is an analog signal, into a digital signal and outputs the digital signal into the digital signal processing circuit 332. The digital signal processing circuit 332 processes the digital signal input from the AD converter circuit 331 and calculates the distance between the own device and the target from the amount of the electric charge distributed and stored into the storage capacitors 343a, 343b and acquires the distance measurement value (measures the distance).

Figure 48:
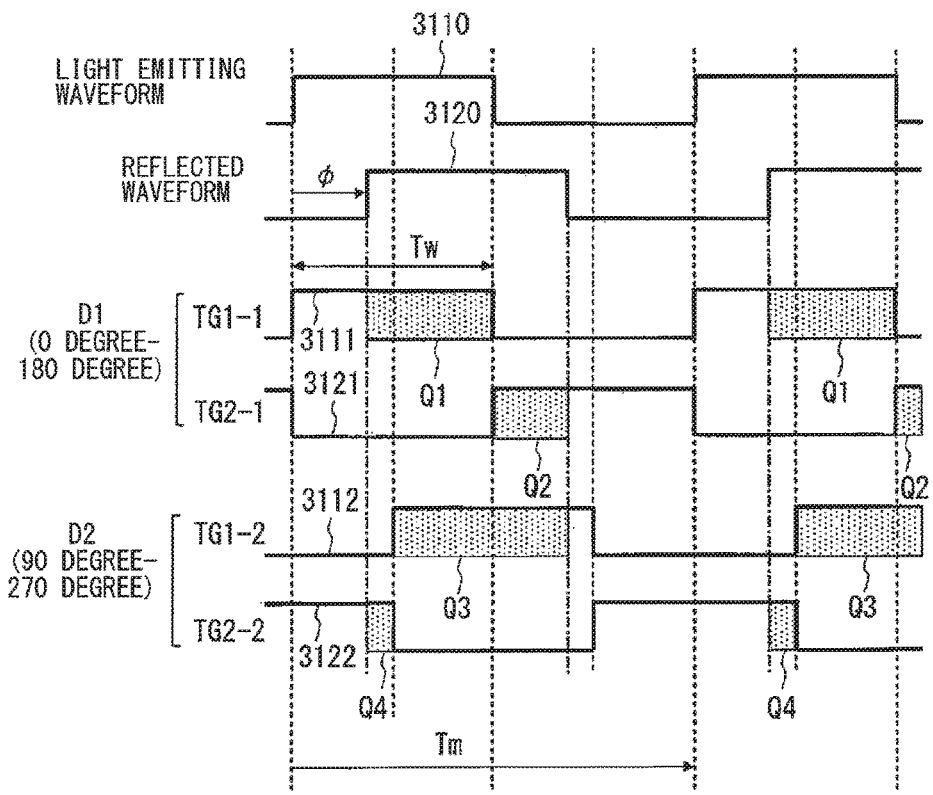
FIG. 48 illustrates a sequence of the configuration of the differential output (No. 1)

FIG. 48 illustrates a sequence in which four phases distance measurement is performed as a duty cycle of the light emitting waveform is set to be 50% (the light receiving element 326 is driven in four phases). The difference detection circuit 330 generates a digital value D1 by repeating a combination of the control signals TG1, TG2, for example, control signals TG1-1 (the driving waveform 3111), TG2-1 (the driving waveform 3121), several ten times to several hundred thousand times. Similarly, the difference detection circuit 330 generates a digital value D2 by repeating the control signals TG1-2 (the driving waveform 3112), TG2-2 (the driving waveform 3122) several ten times to several hundred thousand times. The difference detection circuit 330 outputs the digital values D1, D2 as values from which the DC component is removed. When the control signal TG1 is "H" and the control signal TG2 is "L", each of the digital values D1, D2 is set to "1", and when the control signal TG1 is "L" and the control signal TG2 is "H", each of the digital values D1, D2 is set to "−1". That is, a state of each of the control signals TG1, TG2 is unambiguously determined by whether the value relating to the waveform of Dx is "1" or "−1". In this way, Dx is a signal indicative of the difference between the two storage capacitors 343a, 343b, and therefore the AD converter circuit 331 outputs the signal subjected to the calculation corresponding to a numerator or a denominator in the expression (1) described above.

Figure 49:
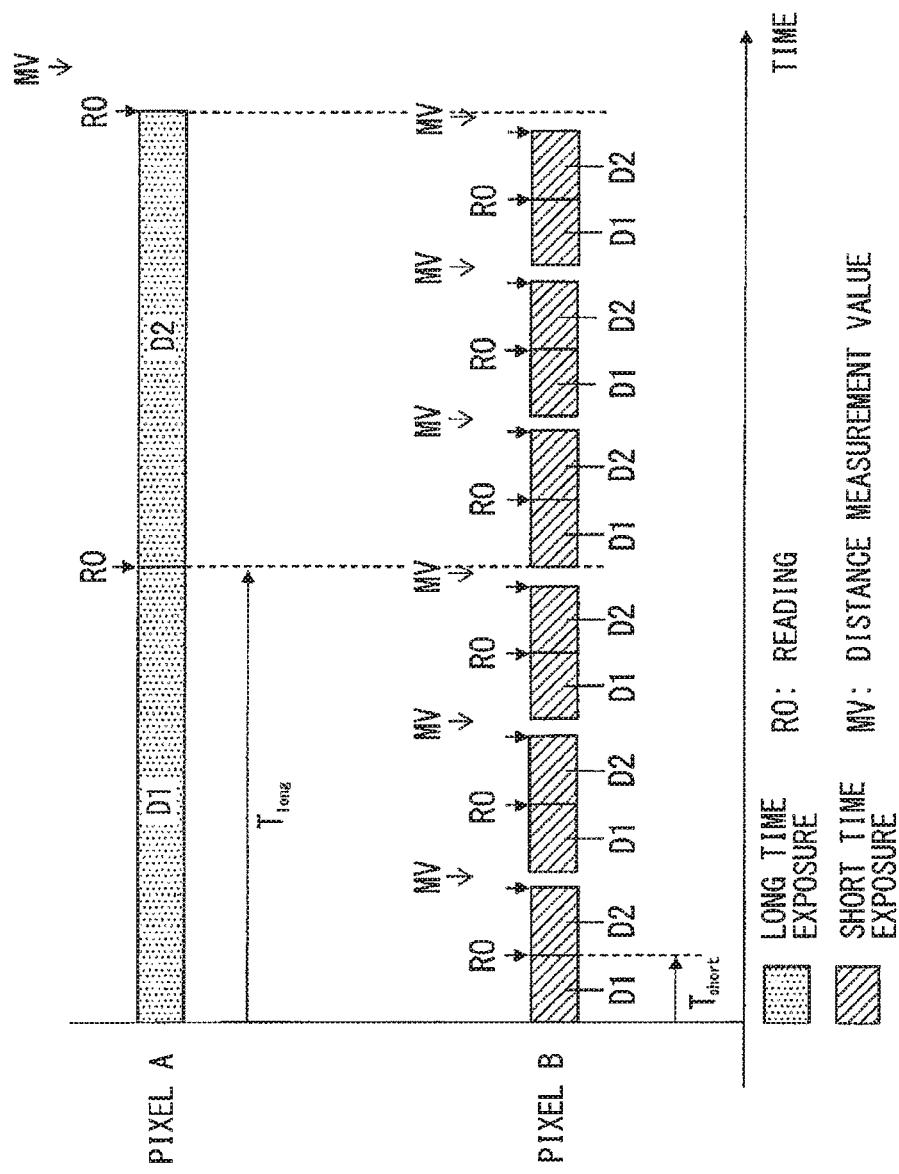
FIG. 49 is a timing chart in which multiple exposure is performed in the configuration of the differential output (No. 1).

FIG. 49 illustrates a timing chart of multiple exposure in a configuration of the differential output of the present disclosure. In an example in FIG. 49, the pixel group of the pixel B performs six times of the short time exposure during a period in which the pixel group of the pixel A performs one time of the long time exposure, and therefore it can be achieved that the frame rate is six times as large as that of the pixel group of the pixel A which performs the long time exposure.

Figure 50:
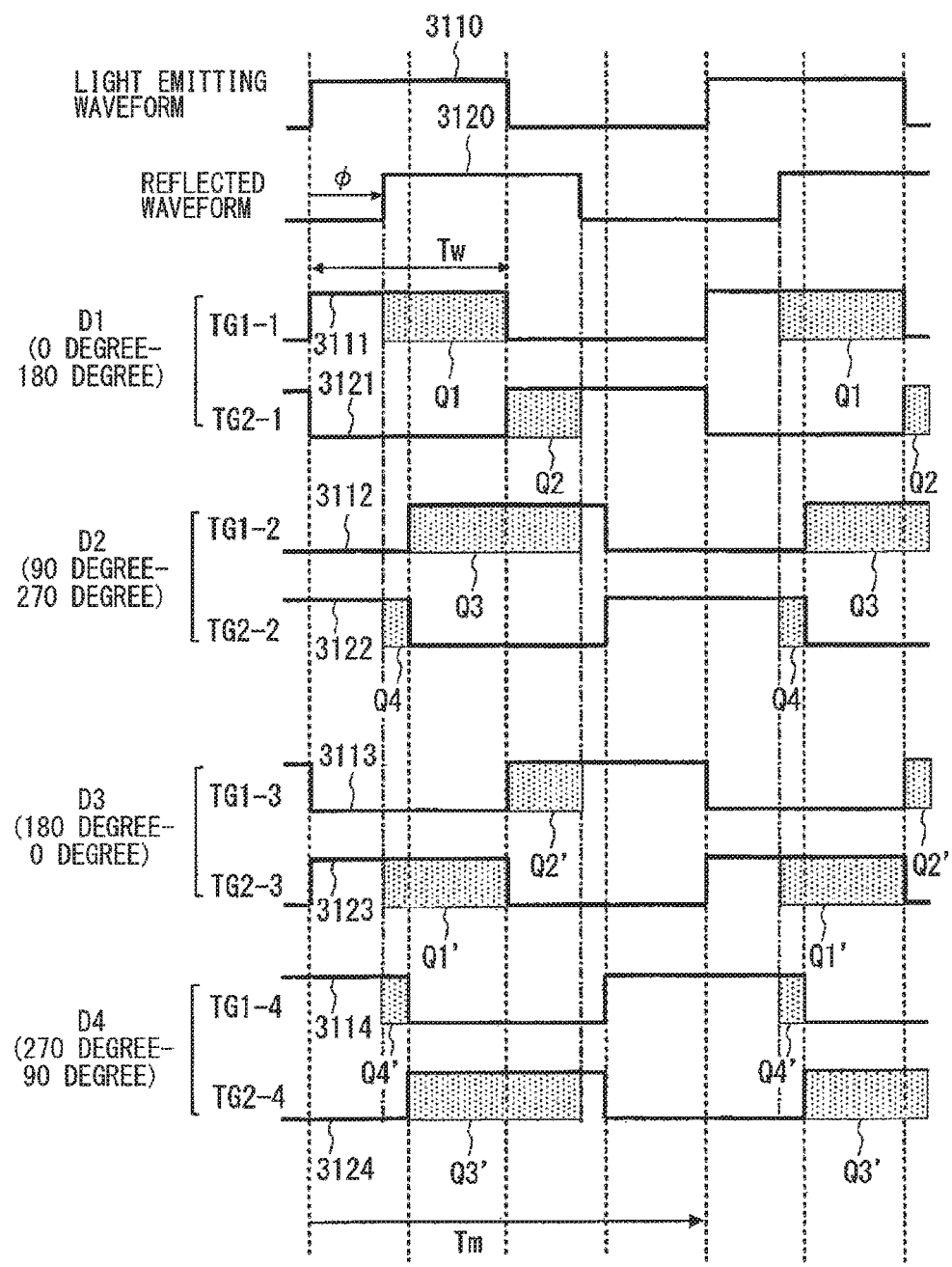
FIG. 50 illustrates a sequence of the configuration of the differential output (No. 2).
Figure 51:
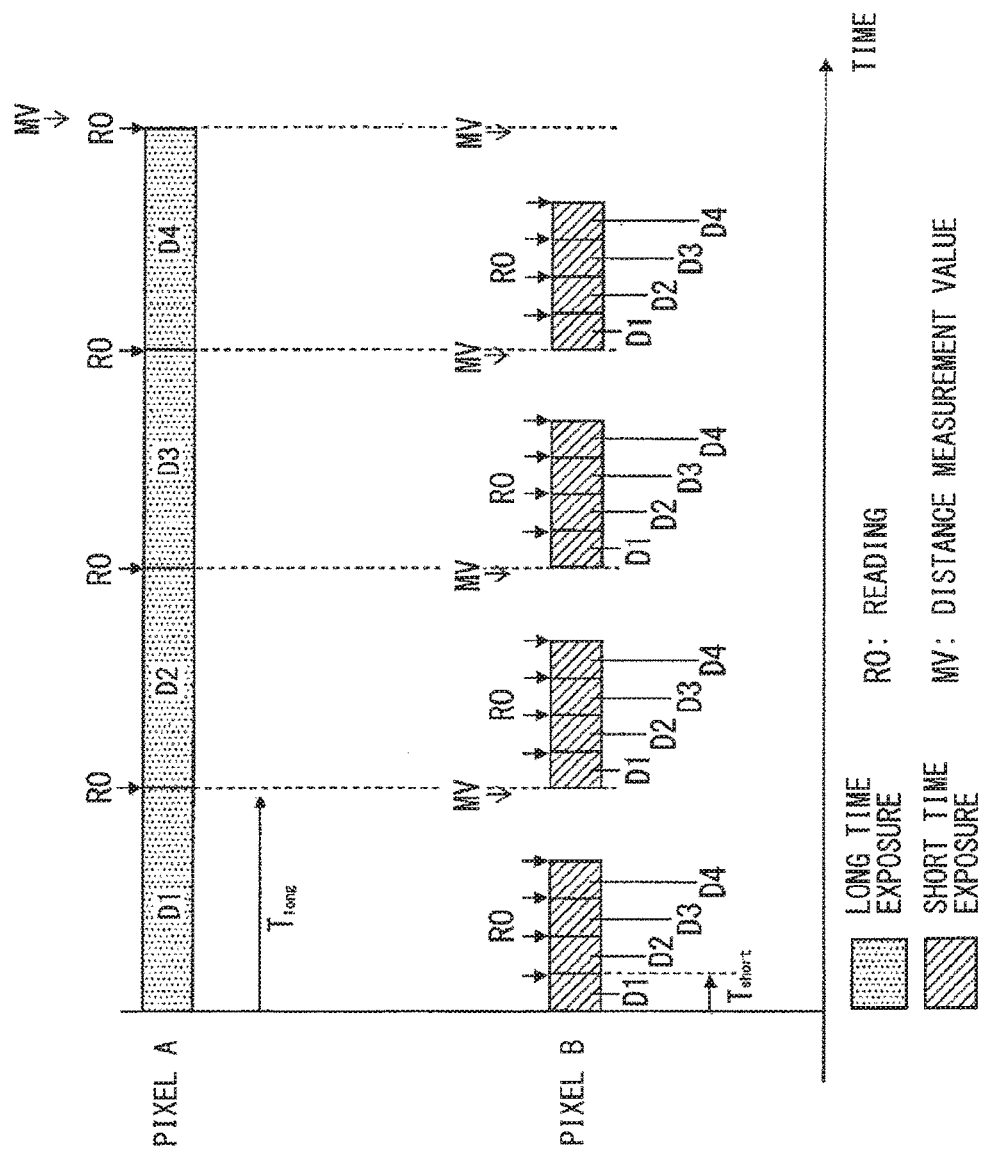
FIG. 51 is a timing chart in which multiple exposure is performed in the configuration of the differential output (No. 2).

FIG. 50 illustrates another sequence of the differential output of the present disclosure, and FIG. 51 illustrates a timing chart of the multiple exposure corresponding to the sequence. In FIG. 48 described above, the digital values D1, D2 are only generated, however in addition to the digital values D1, D2, a digital value D3 is generated by repeating the control signals TG1-3 (waveform 3113), TG2-3 (waveform 3123) several ten times to several hundred thousand times and a digital value D4 is generated by repeating the control signals TG1-4 (waveform 3114), TG2-4 (waveform 3124) several ten times to several hundred thousand times. In an example in FIG. 51, the pixel group of the pixel B performs four times of the short time exposure during a period in which the pixel group of the pixel A performs one time of the long time exposure, and therefore it can be achieved that the frame rate is four times as large as that of the pixel group of the pixel A which performs the long time exposure. Mismatching of the circuit can be avoided, and robustness can be enhanced.

Figure 52:
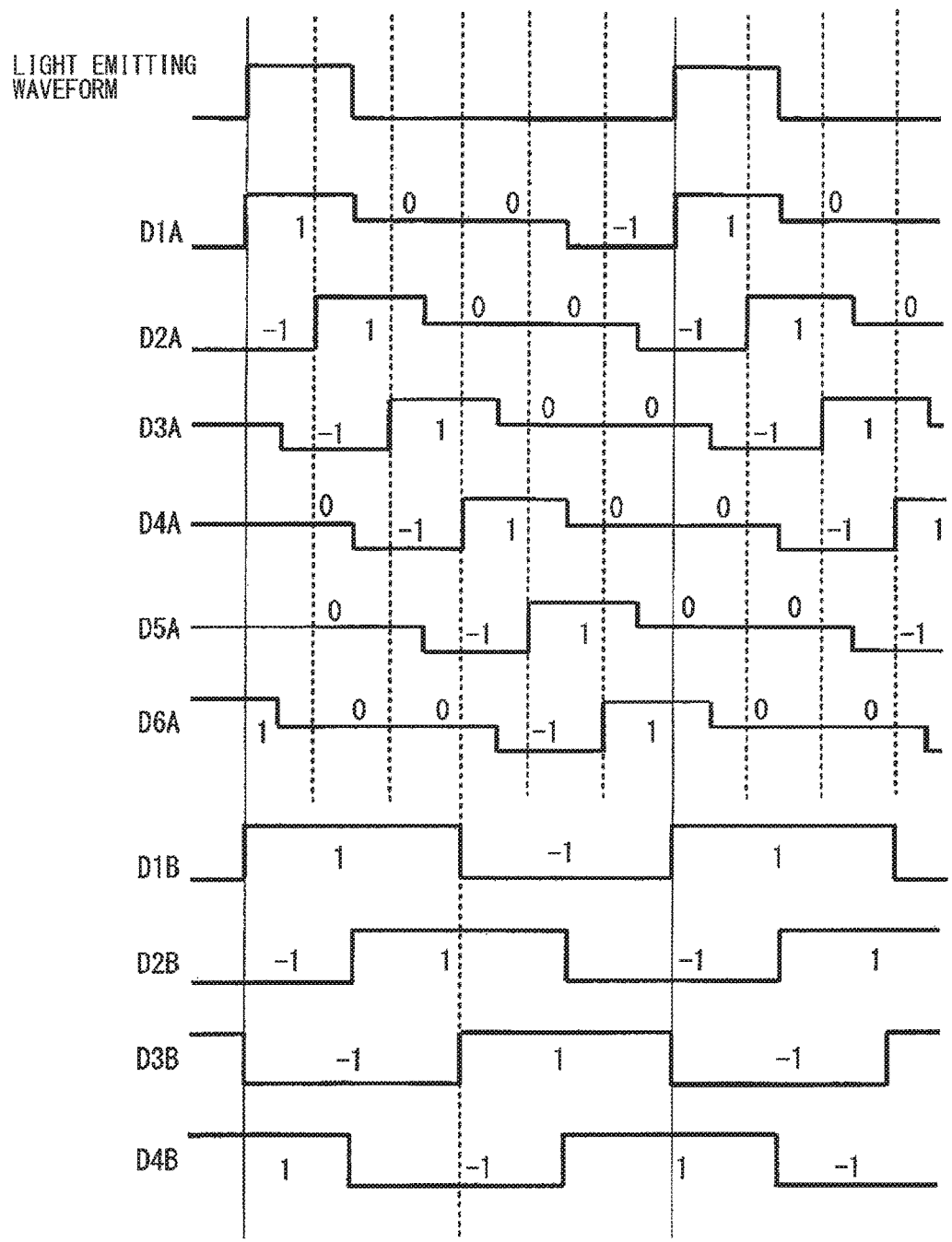
FIG. 52 illustrates a sequence of the configuration of the differential output (No. 3).
Figure 53:
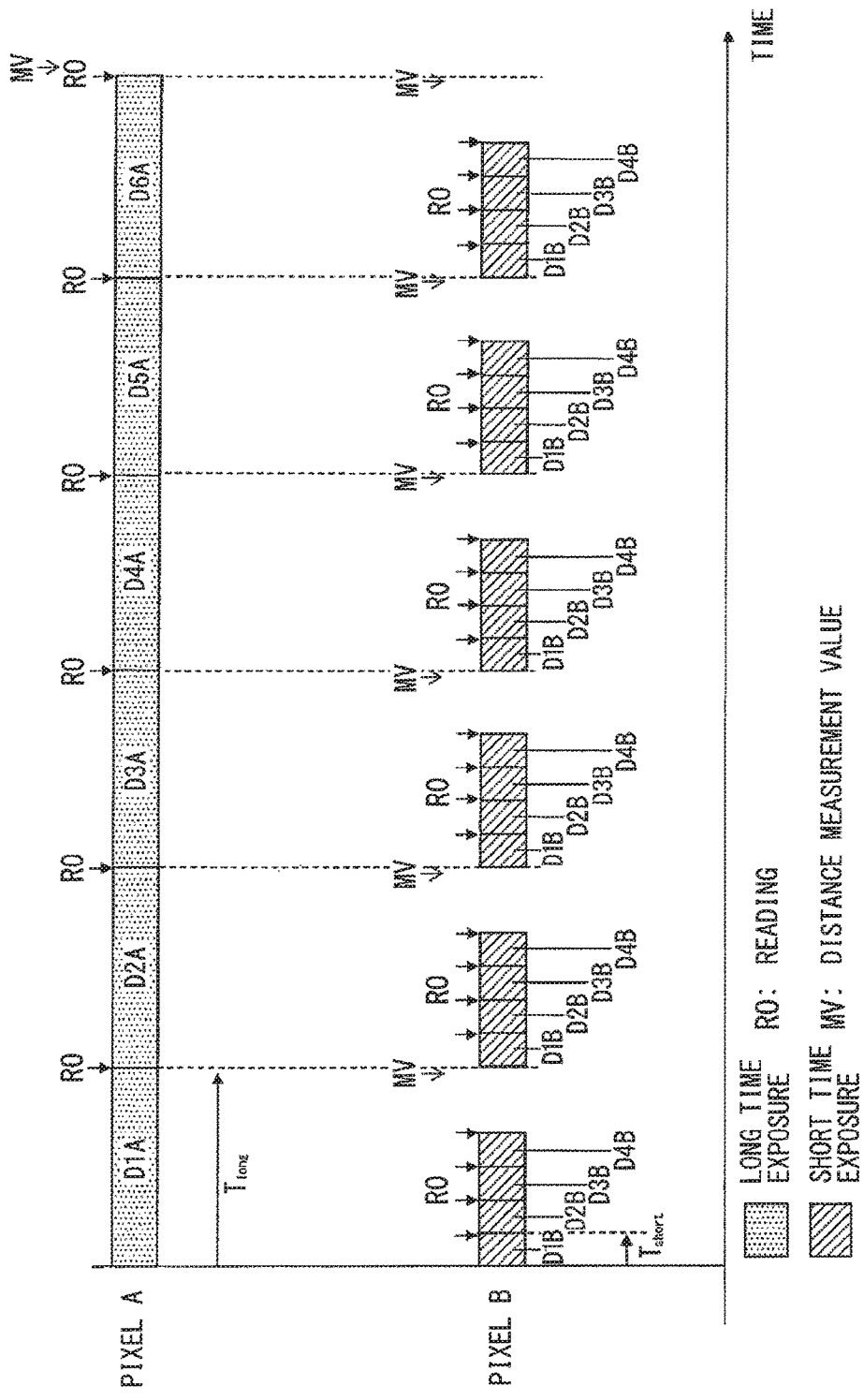
FIG. 53 is a timing chart in which multiple exposure is performed in the configuration of the differential output (No. 3).

FIG. 52 illustrates further another sequence of the differential output of the present disclosure, and FIG. 53 illustrates a timing chart of the multiple exposure corresponding to the sequence. The phase numbers of the long time exposure and short time exposure are not necessarily the same, and they may be different from each other. In an example in FIG. 52 and FIG. 53, the long time exposure is driven in a six phases distance measurement, and the short time exposure is driven in a four phases distance measurement. In the example in FIG. 52 and FIG. 53, by inserting "0", which means a non integration period in which the signal is not integrated, into the long time exposure in addition to "1" and "−1", a sensitivity to a higher-order harmonic is provided. That is, by using a characteristic that energy of a component of the higher-order harmonic is increased as the duty becomes shorter when the duty cycle of the light emitting waveform is set to be shorter than 50%, the energy of the higher-order harmonic is effectively used by providing the sensitivity to a predetermined higher-order harmonic in the long time exposure. The digital signal processing circuit 332 considers the component of the higher-order harmonic by calculating a distance by linearly combining a component of a base wave and the component of the higher-order harmonic, and thereby a distance error can be reduced compared to a case in which the distance is calculated only from the component of the base wave. The present applicant applied for a patent relating to the technique of providing the sensitivity to the higher-order harmonic as Japanese Patent Application No. 2014-226069.

As described above, according to the third embodiment, a similar effect to that of the second embodiment can be obtained also by the configuration of the differential output other than the configuration of the single end output, and the frame rate of the short time exposure can be increased appropriately while expanding the dynamic range appropriately. Also in the third embodiment, it is not limited to the configuration in which the pixels are grouped into the two pixel groups, and the pixels may be grouped into the three pixel groups similar to the second embodiment described above, and the pixel groups may be switched by time.

(Other Embodiments)

The present disclosure is not limited to the embodiments described above, and the present disclosure may be modified or expanded in the following manners.

In the first to the third embodiments, the time-of-flight distance measuring device is used for the vehicle, however the time-of-flight distance measuring device according to the present disclosure may be applied to usage other than the on-vehicle usage.

In the second and the third embodiments, the configurations in which the pixels are grouped into the two pixel groups or the three pixel groups are described as examples, however a configuration in which the pixels are grouped into four or more pixel groups having different exposure periods to each other may be adopted. In a case in which the pixels are grouped into four or more pixel groups, the pixel groups may be switched by time.

In the second and the third embodiments, modification may be performed in any manner on a combination of the number of the phases of the long time exposure and the number of the phases of the short time exposure in the case in which the pixels are grouped into two pixel groups, and a combination of the number of the phases of the long time exposure, the number of the phases of the intermediate time exposure, and the number of the short time exposure in the case in which the pixels are grouped into three pixel groups. In addition, modification may be performed in any manner on a combination of each of the numbers of the phases in a case in which the pixels are grouped into four or more pixel groups.

The invention claimed is:

1. A time-of-flight distance measuring device comprising:
   a light emitting element that emits modulated light modulated by a pattern having a repeating period to a space;
   a driving unit that drives the light emitting element;
   a light receiving element that distributes an electric charge according to incident light including reflected light of the modulated light reflected by a target by using a plurality of modulation switches and stores the electric charge in a plurality of storage capacitors;
   a control unit that controls driving of the plurality of the modulation switches; and
   a distance measurement value acquiring unit that calculates a distance to the target by using a value sampled by the light receiving element to acquire a distance measurement value, wherein
   the control unit
      controls the driving of the plurality of the modulation switches such that a base exposure period is divided into a plurality of sub exposure periods, and
      holds without resetting the electric charge stored during the sub exposure period for a one round period which is one round of the divided sub exposure periods; and
   the distance measurement value acquiring unit
      acquires the distance measurement value of short time exposure from an amount of the electric charge stored during the one round period, and
      acquires the distance measurement value of long time exposure by integrating the amount of the electric charge stored during a plurality of the one round periods.

2. The time-of-flight distance measuring device according to claim 1, wherein
   the light receiving element distributes an electric charge according to the incident light including the reflected light of the modulated light reflected by the target by using two modulation switches and stores the electric charge in two storage capacitors;
   as a base exposure pattern in the base exposure period, the control unit defines a period of 1 in which a control signal that drives one of the two modulation switches is set to be H and a control signal that drives the other modulation switch is set to be L and a period of −1 in which the control signal that drives the one of the two modulation switches is set to be L and the control signal that drives the other modulation switch is set to be H; and
   as a sub exposure pattern in the sub exposure period, the control unit divides each of the period of 1 and the period of −1 by n (n being a natural number equal to or more than 2) such that the period of 1 and the period of −1 are shifted by a phase of 180 degrees and inserts 0 into a period other than the period of 1 and the period of −1.

3. The time-of-flight distance measuring device according to claim 2, wherein
   the control unit inserts 0 by providing a period in the sub exposure pattern in which the control signals that drive the two modulation switches are set to be H.

4. The time-of-flight distance measuring device according to claim 2, wherein
   the light receiving element includes another modulation switch other than the two modulation switches; and
   the control unit inserts 0 in the sub exposure pattern by setting a period in which the control signals that drive the two modulation switches are set to be L and a control signal that drives the other modulation switch is set to be H.

5. The time-of-flight distance measuring device according to claim 2, wherein
   the control unit inserts 0 in the sub exposure pattern by reverse controlling the control signals that drive the two modulation switches so as to integrate a period in which the electric charge stored in one of the two storage capacitors is discarded and a period in which the electric charge stored in the other storage capacitor is discarded.

6. The time-of-flight distance measuring device according to claim 2, wherein
   when a period of the base exposure period is defined as T, in the sub exposure pattern, the control unit sets each of the period of 1 and the period of −1 to be longer than T/(2n).

7. The time-of-flight distance measuring device according to claim 1, wherein
   the distance measurement value acquiring unit includes
      an analog differential signal processing circuit that reads out the amount of the electric charge from the light receiving element by a differential,
      an analog memory that holds an output value of the analog differential signal processing circuit, and
      a differential calculation circuit that calculates a difference between a present output value output at a present output timing from the analog differential signal processing circuit and a previous output value output at a previous output timing from the analog differential signal processing circuit and held by the analog memory.

8. The time-of-flight distance measuring device according to claim 7, wherein the distance measurement value acquiring unit is formed as a switched capacitor circuit.

9. The time-of-flight distance measuring device according to claim 1, wherein
the distance measurement value acquiring unit includes
an AD converter circuit that reads out the amount of the electric charge from the light receiving element by a differential and performs an AD conversion,
a digital memory that holds an output value of the AD converter circuit, and
a difference calculation circuit that calculates a difference between a present output value output at a present output timing from the AD converter circuit and a previous output value output at a previous output timing from the AD converter circuit and held by the digital memory.

10. The time-of-flight distance measuring device according to claim 1, wherein
the control unit controls a sub exposure and the long time exposure that repeats a plurality of sub exposures, by means of a rolling reset and a rolling reading.

11. The time-of-flight distance measuring device according to claim 10, wherein
the control unit determines whether the sub exposure is repeated in accordance with an output value of the sub exposure read out by a row unit.

12. The time-of-flight distance measuring device according to claim 11, wherein
the control unit determines whether the sub exposure is repeated in accordance with the output value of the sub exposure read out by the row unit by using either of an average value, a maximum value, or a minimum value of the value read out from the row.

13. The time-of-flight distance measuring device according to claim 10, wherein
the control unit performs a reset in each pixel in accordance with the output value of the sub exposure read out from the row.

14. The time-of-flight distance measuring device according to claim 1, wherein
the control unit controls a sub exposure and the long time exposure that repeats a plurality of sub exposures, by means of a global reset and a rolling reading.

15. A time-of-flight distance measuring device comprising:
a light emitting element that emits modulated light modulated by a pattern having a repeating period to a space;
a driving unit that drives the light emitting element;
a plurality of light receiving elements that receive incident light including reflected light of the modulated light reflected by a target, each of the receiving elements forming a pixel within a plane;
a control unit that controls storing an electric charge in the plurality of the light receiving elements and reading out the electric charge from the plurality of the light receiving elements; and
a distance measurement value acquiring unit that calculates a distance to the target by using the electric charge read by the control unit from the plurality of the light receiving elements to acquire a distance measurement value,
wherein
the control unit groups the plurality of the light receiving elements into several pixel groups and controls the driving of the plurality of the light receiving elements such that, in a period during which the distance measurement value acquiring unit performs one acquisition of the distance measurement value due to the light receiving elements belonging to one pixel group one performing a long time exposure once, the distance measurement value acquiring unit performs a plurality of acquisitions of the distance measurement value due to the light receiving elements belonging to other pixel groups performing a short time exposure multiple times.

16. The time-of-flight distance measuring device according to claim 15, wherein
the control unit controls the driving of the plurality of the light receiving element such that, during a period in which the light receiving elements belonging to the one pixel group perform the long time exposure once by repeating n times of storing an electric charge and n times of reading out the electric charge based on n phases (n being a natural number equal to or more than 2), the light receiving elements belonging to the other pixel groups perform the short time exposure multiple times, each short time exposure including repeating n times of storing the electric charge and n times of reading out the electric charge.

17. The time-of-flight distance measuring device according to claim 16, wherein
the control unit controls the driving of the plurality of the light receiving elements by using a driving waveform in which rectangular waveforms with a duty cycle of 50% are shifted by $2\pi/n$.

18. The time-of-flight distance measuring device according to claim 15, wherein
the control unit controls the driving of the plurality of the light receiving element such that, during a period in which the light receiving elements belonging to the one pixel group perform the long time exposure once by repeating n times of storing an electric charge and n times of reading out the electric charge based on n phases (n being a natural number equal to or more than 2), the light receiving elements belonging to the other pixel groups perform the short time exposure multiple times, each short time exposure including repeating m times of storing the electric charge and m times of reading out the electric charge based on m phase (m being a natural number equal to or more than 2 and being a different number from n).

19. The time-of-flight distance measuring device according to claim 18, wherein
the control unit controls the driving of the light receiving elements belonging to the one pixel group by using a driving waveform in which rectangular waveforms with a duty cycle of 50% are shifted by $2\pi/n$ and controls the driving of the light receiving elements belonging to the other pixel groups by using a driving waveform in which rectangular waveforms with a duty cycle of 50% are shifted by $2\pi/m$.

20. The time-of-flight distance measuring device according to claim 15, wherein
the distance measurement value acquiring unit acquires the distance measurement value by calculating a distance to the target by using a single ended value output from the plurality of the light receiving elements.

21. The time-of-flight distance measuring device according to claim 15, wherein
the distance measurement value acquiring unit acquires the distance measurement value by calculating a distance to the target by using a differential value output from the plurality of the light receiving elements.

22. The time-of-flight distance measuring device according to claim 21, wherein
- the control unit controls the driving of the light receiving elements belonging to the pixel group which performs the long time exposure such that the light receiving elements belonging to the pixel group which performs the long time exposure has a sensitivity to at least one higher-order harmonic; and
- the distance measurement value acquiring unit acquires the distance measurement value by linearly combining a component of a base wave and a component of the at least one higher-order harmonic in the light receiving elements belonging to the pixel group which performs the long time exposure.

23. The time-of-flight distance measuring device according to claim 15, wherein
- the control unit
  - defines the other pixel groups to be one other pixel group, and
  - groups the plurality of light receiving elements such that the light receiving elements belonging to the one pixel group and the light receiving elements belonging to the other pixel group are arranged as alternating row units.

24. The time-of-flight distance measuring device according to claim 15, wherein
- the control unit
  - defines the other pixel groups to be one other pixel group, and
  - groups the light receiving elements belonging to the one pixel group and the light receiving elements belonging to the other pixel group to form a checkered pattern.

25. The time-of-flight distance measuring device according to claim 15, wherein
- the control unit
  - defines two other pixel groups as including a first other pixel group and a second other pixel group,
  - groups the light receiving elements belonging to one of the one pixel group, the first other pixel group, and the second other pixel group to form a checkered pattern, and
  - groups the light receiving elements belonging to the remaining two pixel groups to be arranged as alternating row units at a remaining space of the checkered pattern.

26. The time-of-flight distance measuring device according to claim 15, wherein
- the control unit
  - defines the other pixel groups as including a first other pixel group and a second other pixel group, and
  - groups all pixel groups including the one pixel group, the first other pixel group, and the second other pixel group to be arranged in every row.

27. The time-of-flight distance measuring device according to claim 15, wherein
- the control unit switches between a period in which a predetermined light receiving element belongs to the one pixel group and a period in which the predetermined light receiving element belongs to the other pixel groups.

* * * * *